United States Patent
Matsuya et al.

(10) Patent No.: US 8,731,006 B2
(45) Date of Patent: May 20, 2014

(54) SIGNAL SEPARATING CIRCUIT, SIGNAL SEPARATING METHOD, SIGNAL MULTIPLEXING CIRCUIT AND SIGNAL MULTIPLEXING METHOD

(75) Inventors: Yasuyuki Matsuya, Kanagawa-ken (JP); Takako Ishihara, Kanagawa-ken (JP); Shinichiro Mutoh, Kanagawa-ken (JP); Sadayuki Yasuda, Kanagawa-ken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 383 days.

(21) Appl. No.: 13/004,963

(22) Filed: Jan. 12, 2011

(65) Prior Publication Data

US 2011/0170636 A1    Jul. 14, 2011

Related U.S. Application Data

(62) Division of application No. 12/084,996, filed as application No. PCT/JP2006/324451 on Dec. 7, 2006, now Pat. No. 7,894,490.

(30) Foreign Application Priority Data

Dec. 7, 2005  (JP) ................................. 2005-353399
Jul. 25, 2006  (JP) ................................. 2006-201807

(51) Int. Cl.
   *H04J 3/04*   (2006.01)

(52) U.S. Cl.
   USPC .......................................... 370/533; 370/535

(58) Field of Classification Search
   USPC ......... 370/532, 533, 535, 537, 538, 539, 540, 370/541
   See application file for complete search history.

(56) References Cited

U.S. PATENT DOCUMENTS

| | | | | |
|---|---|---|---|---|
| 3,873,777 | A * | 3/1975 | Uehara et al. ................. | 370/477 |
| 3,889,293 | A * | 6/1975 | Muraco et al. ................ | 386/337 |
| 4,731,781 | A | 3/1988 | Nakamura | |
| 2003/0039009 | A1* | 2/2003 | Nakamura .................... | 359/135 |

FOREIGN PATENT DOCUMENTS

JP    2005-303820 A    10/2005

* cited by examiner

*Primary Examiner* — Brenda H Pham
(74) *Attorney, Agent, or Firm* — Harness, Dickey & Pierce, P.L.C.

(57) ABSTRACT

When a data signal of a first channel is an RZ signal having a pulse period $T_1$ and a logic "1" pulse width m, a data signal of a second channel is an RZ signal having a pulse period $T_2$ and a logic "1" pulse width n and the relation n<m is satisfied, a multiplexed signal D obtained by time-division multiplexing the data signals of two channels is input. A pulse signal with a pulse width k satisfying $n<k<\min(m, T_2)$ is generated at timing of a leading edge of the data signal of each channel. When the multiplexed signal D is judged as logic "1" at timing of a trailing edge of the pulse signal, the data signal of the first channel is output. Similarly, when the multiplexed signal D is judged as logic "0", the data signal of the second channel is output.

7 Claims, 22 Drawing Sheets n < m    n < k < min (m, T₂)

$\max(n_2 \sim n_5) < m$ $\max(n_2 \sim n_5) < k < \min(m, T_2 \sim T_5)$ $X2 = T_1 - k + n_2 / 2$ $X3 = T_1 - k + T_2 + n_3 / 2$ $X4 = T_1 - k + T_2 + T_3 + n_4 / 2$ $X5 = T_1 - k + T_2 + T_3 + T_4 + n_5 / 2$ (1)

(2)

(3)

(4)

US 8,731,006 B2

SIGNAL SEPARATING CIRCUIT, SIGNAL SEPARATING METHOD, SIGNAL MULTIPLEXING CIRCUIT AND SIGNAL MULTIPLEXING METHOD

CROSS-REFERENCE TO RELATED APPLICATION

This application is a divisional of U.S. application Ser. No. 12/084,996, filed Jan. 13, 2009, which is a U.S. National Stage application claiming the benefit of prior filed International Application Number PCT/JP2006/324451, filed Dec. 7, 2006, in which the International Application claims priorities from Japanese Application Numbers 2005-353399 (filed on Dec. 7, 2005) and 2006-201807 (filed on Jul. 25, 2006), the entire contents of which are incorporated herein by reference.

TECHNICAL FIELD

The present invention relates to a signal separating circuit and a signal separating method for receiving a multiplexed signal obtained by time-division multiplexing RZ (Return to Zero) data signals corresponding to a plurality of channels and separating the multiplexed signal into RZ data signals corresponding to the respective channels. The present invention also relates to a signal multiplexing circuit and a signal multiplexing method for generating a multiplexed signal by time-division multiplexing RZ data signals corresponding to a plurality of channels different in pulse period.

BACKGROUND ART

FIG. 21 shows an example of configuration of a signal multiplexing circuit according to the background art (Patent Document 1). FIG. 22 is a time chart showing an example of the operation of the signal multiplexing circuit according to the background art. The abscissa axis in FIG. 22 expresses time. Here is shown the case where a two-channel multiplexed signal is generated.

In FIGS. 21 and 22, an NRZ (Non Return to Zero) signal A0 of channel A input to a signal input terminal 101 is input to a first input terminal of a three-input AND (logical product) 104. An NRZ signal B0 of channel B input to a signal input terminal 102 is input to a first input terminal of a four-input AND 105. A clock CK input to a clock input terminal 103 is successively frequency-divided by TFFs (T flip-flops) 106, 107 and 108 into frequency-divided clocks (CK/2, CK/4 and CK/8) in which the frequency is divided into ½, ¼ and ⅛ in view from the input side. The ⅛ frequency-divided clock output from the TFF 108 is further passed through an inverter 109 from which an inverted ⅛ frequency-divided clock is output. Assuming now that the period of the input clock CK is 2 T, then the pulse period (repetition period) of the NRZ signals A0 and B0 is 16 T.

The three-input AND 104 receives the ¼ frequency-divided clock and the ⅛ frequency-divided clock input to second and third input terminals thereof and outputs an RZ signal A1 obtained by ANDing these clocks and the NRZ signal A0. When the RZ signal A1 shows logic "1", the RZ signal A1 exhibits a duty ratio of 25% (a "Hi" level period of 4 T and a "Lo" level period of 12 T) for a pulse period of 16 T. On the other hand, the four-input AND 105 receives the ½ frequency-divided clock, the ¼ frequency-divided clock and the inverted ⅛ frequency-divided clock input to second, third and fourth input terminals thereof and outputs an RZ signal B1 obtained by ANDing these clocks and the NRZ signal B0. When the RZ signal B1 shows logic "1", the RZ signal B1 rises 8 T behind the NRZ signal B0 input to the signal input terminal 102 so that the RZ signal B1 exhibits a duty ratio of 12.5% (a "Hi" level period of 2 T and a "Lo" level period of 14 T) for a pulse period of 16 T.

A selector 110 selects the RZ signals A1 and B1 alternately in accordance with the ⅛ frequency-divided clock and outputs a multiplexed signal D with respective pulse widths of 4 T and 2 T for the pulse period 16 T of the NRZ signals A0 and B0. An OR (logical sum) may be used in place of the selector 110. As the multiplexed signal D, the RZ signals A1 and B1 are multiplexed at duty ratios of 50% and 25% respectively as well as the pulse period of each of channels multiplexed is equally 8 T for the pulse period (repetition period) 16 T of the input signal as one frame.

FIG. 23 shows an example of configuration of a background-art signal separating circuit for separating a two-channel multiplexed signal. Here is shown an example of configuration in which a CDR (Clock Data Recovery) circuit and two latches are used in combination. FIG. 24 is a time chart showing an example of the operation of the CDR circuit. The abscissa axis in FIG. 24 expresses time. FIG. 25 is a time chart showing an example of the operation of the signal separating circuit according to the background art. The abscissa axis in FIG. 25 expresses time.

In FIG. 23, the CDR circuit is composed of a PLL circuit which includes a phase comparator 151, a charge pump circuit 152, a loop filter 153, a VCO (voltage-controlled oscillator) 154, and a ½ frequency divider 155. As shown in FIG. 24, the phase comparator 151 receives a two-channel multiplexed signal D and an output signal CK2 of the ½ frequency divider 155 as two inputs, and outputs a pulse signal s1 having a pulse width corresponding to the phase difference between the two inputs. The pulse signal s1 is integrated by the loop filter 153 via the charge pump circuit 152, so that the oscillation frequency of the VCO 154 is controlled by the integrated output of the loop filter 153.

Although the VCO 154 is set to oscillate approximately twice as high as the pulse frequency of the multiplexed signal D, the oscillation frequency of the VCO 154 is controlled by the function of the CDR circuit (PLL circuit) so as to be accurately equal to twice as high as the pulse frequency of the multiplexed signal D. Incidentally, the CDR circuit performs a synchronous operation in accordance with the logic "1" pulse of the two-channel multiplexed signal D input to the CDR circuit. The time chart shown in FIG. 25 shows a state where the input multiplexed signal D, the output signal CK1 of the VCO 154 and the output signal CK2 of the ½ frequency divider 155 are synchronized with one another.

The output signal CK2 of the ½ frequency divider 155 synchronized with the multiplexed signal D is converted into a clock CK3 further frequency-divided to ½ by a ½ frequency divider 156. The clock CK3 is input to a latch 158. The clock CK3 is converted into an inverted clock CK4 with an inverted phase by an inverter 157. The inverted clock CK4 is input to a latch 159. The latch 158 latches the multiplexed signal D at a leading edge of the clock CK3 and separates a data signal D1 of channel 1. The latch 159 latches the multiplexed signal D at a leading edge of the inverted clock CK4 and separates a data signal D2 of channel 2.

FIG. 26 shows an example of configuration of a background-art signal separating circuit for separating a four-channel multiplexed signal (Patent Document 1). FIG. 27 is a time chart showing an example of the operation of the background-art signal separating circuit shown in FIG. 26. The abscissa axis in FIG. 27 expresses time. Although here is shown a process in which a four-channel multiplexed signal is separated into output terminals corresponding to four channels, a difference in duty ratio (pulse width) between a channel for base timing marker and another channel is used for the separating process. That is, in FIG. 27, four clocks are assigned to the pulse period of each channel, and two clocks (duty ratio of 50%) and one clock (duty ratio of 25%) are assigned to the pulse width of channel A and the pulse width of each of channels B to D, respectively. Incidentally, assume that the clock CK is generated in synchronization with the input four-channel multiplexed signal by use of the CDR circuit shown in FIG. 23.

In FIGS. 26 and 27, a latch 161 latches the input four-channel multiplexed signal D with the clock CK and outputs a latched data string ca. A delay 162 delays the latched data string ca for one clock and outputs a delayed data string cb. A wide pulse detector 163 separates only channel A having a wider pulse width than the other channels by ANDing the latched data string ca and the delayed data string cb and outputs it as a frame leading timing pulse cc. The frame leading timing pulse cc is a key pulse for deciding the physical position of each channel in the latched data string ca, so that channels B to D are separated with this timing used as a base point.

A masking pulse generator 164 receives the latched data string ca and the frame leading timing pulse cc as inputs, and outputs a mask pattern cd obtained by widening the pulse width of the frame leading timing pulse cc by 3 clocks' length corresponding to the leading edge of the following channel B of the data string ca. A phase shifter 165 gives a predetermined delay amount corresponding to the leading edge of each of channels B, C and D in the latched data string ca to the mask pattern cd and outputs a series of mask patterns cd, ce, cf and cg. An channel separator 166 separates data ch, ci, cj and ck of respective channels A to D by ANDing the delayed data string cb with the mask patterns cd, ce, cf and cg.

Incidentally, since channel A must be always a signal of logic "1" to generate the frame leading timing pulse cc and need be different in pulse width from data of the other channels B to D, the channels allowed to be actually used for data transmission are channels B to D.

Patent Document 1: Japanese Unexamined Patent Application Publication No. 2005-303820

DISCLOSURE

Problems to be Solved

The signal separating circuit according to the background art is configured so that a clock synchronized with an input multiplexed signal is regenerated by use of a CDR circuit and signals of respective channels are separated by use of the clock. That is, clock regeneration was indispensable to the signal separating circuit according to the background art. However, since the voltage-controlled oscillator (VCO) operating at a high frequency (twice as high as the clock frequency) was included in the phase-locked loop (PLL) circuit for forming the CDR circuit, there was a problem that electric power consumption was large. Moreover, since the loop filter having a long time constant, or the like, was included, there was a problem that the sync lead-in time became long.

Incidentally, the background-art signal separating circuit for separating a multiplexed signal including three or more channels is configured so that frame leading timing corresponding to a channel for base timing marker is detected by use of a difference in pulse width between the channel for base timing marker and each of the other channels to thereby separate signals of the other channels with reference to the frame leading timing as shown in FIGS. 26 and 27. Also in this circuit configuration, clock regeneration was a prerequisite.

Incidentally, when each of RZ signals to be time-division multiplexed is transmitted as an optical signal, a minimum value of the "Hi" level period and the "Lo" level period is decided in accordance with the response speed of light emitting components for transmission and light receiving components for reception. That is, as the "Hi" level period or the "Lo" level period of the RZ signal becomes narrower, higher-speed optical components are required correspondingly.

In the case where duty ratios (pulse widths) of respective channels are intended to be differentiated from one another when the pulse periods of the respective channels are uniform as in the multiplexed signal D shown in FIGS. 22, 25 and 27, the "Hi" level period or "Lo" level period of a specific channel may become very narrow. In this case, high-speed optical components are still required, and this causes an increase in cost of a transmitter-receiver.

On the other hand, when the "Hi" level period or "Lo" level period of each of RZ signals to be multiplexed is intended to be widened in order to achieve a transmitter-receiver at low cost, the pulse period of each channel cannot but be made long. As a result, data transmission speed is lowered, so that when, for example, audio is multiplexed and transmitted as a 1-bit quantized signal, audio quality is lowered.

An object of the present invention is to provide a signal separating circuit and a signal separating method in which a multiplexed signal can be separated into RZ signals of a plurality of channels without use of a clock synchronized with the multiplexed signal by a configuration of low electric power consumption, high response speed and low components cost.

Another object of the invention is to provide a signal multiplexing circuit and a signal multiplexing method in which RZ signals of a plurality of channels with different pulse widths can be multiplexed without lowering of data transmission speed.

Means for Solving the Problems

A first invention provides a signal separating circuit for receiving a multiplexed signal D and separating the multiplexed signal D into data signals D1 and D2 of respective channels, when the multiplexed signal D is a signal obtained by time-division multiplexing data signals of two channels, i.e., a data signal of a first channel which is an RZ (Return to Zero) signal having a pulse period $T_1$ and a logic "1" pulse width m and a data signal of a second channel which is an RZ signal having a pulse period $T_2$ and a logic "1" pulse width n, the values m and n satisfying the relation n<m, the signal separating circuit including a first differentiating unit which receives the multiplexed signal D, detects a leading edge of logic "1" of the data signal of each channel and outputs a first pulse signal P1 indicating timing thereof, a first pulse widening unit which outputs a second pulse signal P2 with each pulse of the first pulse signal P1 as a trigger so that a pulse width k of each pulse of the second pulse signal P2 satisfies a condition $$n < k < \min(m, T_2)$$

in which $\min(m, T_2)$ is a smaller one of m and $T_2$, a first pulse generating unit which judges whether the multiplexed signal D is logic "1" or logic "0" at timing of a trailing edge of the second pulse signal P2, generates a pulse signal having a predetermined pulse width when the multiplexed signal D is logic "1", and outputs the pulse signal as the data signal D1 of the first channel, and a second pulse generating unit which judges whether the multiplexed signal D is logic "1" or logic "0" at timing of a trailing edge of the second pulse signal P2, generates a pulse signal having a predetermined pulse width when the multiplexed signal D is logic "0", and outputs the pulse signal as the data signal D2 of the second channel.

In the signal separating circuit according to the first invention, the first pulse generating unit includes a second differentiating unit which detects a trailing edge of each pulse of the second pulse signal P2 and outputs a third pulse signal P3 indicating timing thereof, an AND unit which receives the third pulse signal P3 and the multiplexed signal D and outputs an ANDed signal P4 by ANDing the third pulse signal P3 and the multiplexed signal D, and a second pulse widening unit which widens the pulse width of the ANDed signal P4 to a predetermined pulse width to thereby generate the data signal D1 of the first channel.

In the signal separating circuit according to the first invention, the first pulse generating unit includes an AND unit which receives an inverted pulse signal $\overline{P2}$ obtained by logically inverting the second pulse signal P2 and the multiplexed signal D and outputs an ANDed signal P4 by ANDing the inverted pulse signal $\overline{P2}$ and the multiplexed signal D, and a second pulse widening unit which widens the pulse width of the ANDed signal P4 to a predetermined pulse width to thereby generate the data signal D1 of the first channel.

In the signal separating circuit according to the first invention, the second pulse generating unit includes a second differentiating unit which detects a trailing edge of each pulse of the second pulse signal P2 and outputs a third pulse signal P3 indicating timing thereof, an AND unit which receives the third pulse signal P3 and an inverted multiplexed signal $\overline{D}$ obtained by logically inverting the multiplexed signal D and outputs an ANDed signal P5 by ANDing the third pulse signal P3 and the inverted multiplexed signal $\overline{D}$, and a third pulse widening unit which widens the pulse width of the ANDed signal P5 to a predetermined pulse width to thereby generate the data signal D2 of the second channel.

In the signal separating circuit according to the first invention, the second pulse generating unit includes an AND unit which receives the second pulse signal P2 and an inverted multiplexed signal $\overline{D}$ obtained by logically inverting the multiplexed signal D and outputs an ANDed signal P5 by ANDing the second pulse signal P2 and the inverted multiplexed signal $\overline{D}$, and a second pulse widening unit which widens the pulse width of the ANDed signal P5 to a predetermined pulse width to thereby generate the data signal D2 of the second channel.

A second invention provides a signal separating circuit for receiving a multiplexed signal D and separating the multiplexed signal D into data signals D2 to DN of second to N-th channels (in which N is an integer not smaller than 3), when the multiplexed signal D is a signal obtained by time-division multiplexing data signals of N channels, i.e., a data signal of a first channel which is an RZ signal having a pulse period $T_1$ and a logic "1" pulse width m and data signals of second to N-th channels which are RZ signals having pulse periods $T_2$ to $T_N$ and logic "1" pulse widths $n_2$ to $n_N$ respectively, the values m and $n_2$ to $n_N$ satisfying the relation $\max(n_2 \text{ to } n_N) < m$ in which $\max(n_2 \text{ to } n_N)$ is a maximum one of the values $n_2$ to $n_N$, the signal separating circuit including a first differentiating unit which receives the multiplexed signal D with the data signal of the first channel as logic "1", detects a leading edge of logic "1" of the data signal of each channel and outputs a first pulse signal P1 indicating timing thereof, a pulse widening unit which outputs a second pulse signal P2 with each pulse of the first pulse signal P1 as a trigger so that a pulse width k of each pulse of the second pulse signal P2 satisfies a condition $$\max(n_2 \text{ to } n_N) < k < \min(m, T_2 \text{ to } T_N)$$

in which $\min(m, T_2 \text{ to } T_N)$ is a smallest one of m and $T_2$ to $T_N$; a marker signal generating unit which judges whether the multiplexed signal D is logic "1" or logic "0" at timing of a trailing edge of the second pulse signal P2, and outputs a marker signal L1 indicating timing of the data signal of the first channel when the multiplexed signal D is logic "1"; first to (N−1)-th latch pulse generating units which generate first to (N−1)-th latch pulses having such pulse widths that trailing edges of the first to (N−1)-th latch pulses are located within pulse widths of the data signals of the second to N-th channels with the marker signal L1 as a base point, and first to (N−1)-th latch units which latch the multiplexed signal D at the trailing edges of the first to (N−1)-th latch pulses and output the latched signals as the data signals D2 to DN of the second to N-th channels.

In the signal separating circuit according to the second invention, the marker signal generating unit includes a second differentiating unit which detects a trailing edge of each pulse of the second pulse signal P2 and outputs a third pulse signal P3 indicating timing thereof, and an AND unit which receives the third pulse signal P3 and the multiplexed signal D and outputs an ANDed signal as the marker signal L1 by ANDing the third pulse signal P3 and the multiplexed signal D.

In the signal separating circuit according to the second invention, the marker signal generating unit is an AND unit which receives an inverted pulse signal $\overline{P2}$ obtained by logically inverting the second pulse signal $\overline{P2}$ and the multiplexed signal D and outputs an ANDed signal as the marker signal L1 by ANDing the inverted pulse signal $\overline{P2}$ and the multiplexed signal D.

In the signal separating circuit according to the first invention or the second invention, the first differentiating unit receives the multiplexed signal D, replicates the multiplexed signal D to form two multiplexed signals D, ANDs a delayed and inverted multiplexed signal obtained by delaying one of the two multiplexed signals D for a predetermined delay amount and logically inverting it and the other of the two multiplexed signals D, and generates the first pulse signal P1 each pulse of which has a pulse width corresponding to the delay amount, at timing of a leading edge of logic "1" of the data signal of each channel.

In the signal separating circuit according to the first invention or the second invention, the second differentiating unit receives the second pulse signal P2, replicates the second pulse signal P2 to form two second pulse signals P2, ANDs a delayed pulse string obtained by delaying one of the two second pulse signals P2 for a predetermined delay amount and an inverted pulse string obtained by logically inverting the other of the two second pulse signals P2, and generates the third pulse signal P3 each pulse of which has a pulse width corresponding to the delay amount, at timing of a trailing edge of each pulse of the second pulse signal P2.

A third invention provides a signal separating method for receiving a multiplexed signal D and separating the multiplexed signal D into data signals D1 and D2 of respective channels, when the multiplexed signal D is a signal obtained by time-division multiplexing data signals of two channels, i.e., a data signal of a first channel which is an RZ signal having a pulse period $T_1$ and a logic "1" pulse width m and a data signal of a second channel which is an RZ signal having a pulse period $T_2$ and a logic "1" pulse width n, the values m and n satisfying the relation n<m, the signal separating method including a first differentiating step receiving the multiplexed signal D, detecting a leading edge of logic "1" of the data signal of each channel and outputting a first pulse signal P1 indicating timing thereof, a first pulse widening step outputting a second pulse signal P2 with each pulse of the first pulse signal P1 as a trigger so that a pulse width k of each pulse of the second pulse signal P2 satisfies a condition $$n<k<\min(m,T_2)$$

in which $\min(m, T_2)$ is a smaller one of m and $T_2$; a first pulse generating step judging whether the multiplexed signal D is logic "1" or logic "0" at timing of a trailing edge of the second pulse signal P2, generating a pulse signal having a predetermined pulse width when the multiplexed signal D is logic "1", and outputting the pulse signal as the data signal D1 of the first channel, and a second pulse generating step judging whether the multiplexed signal D is logic "1" or logic "0" at timing of a trailing edge of the second pulse signal P2, generating a pulse signal having a predetermined pulse width when the multiplexed signal D is logic "0", and outputting the pulse signal as the data signal D2 of the second channel.

A fourth invention provides a signal separating method for receiving a multiplexed signal D and separating the multiplexed signal D into data signals D2 to DN of second to N-th channels (in which N is an integer not smaller than 3), when the multiplexed signal D is a signal obtained by time-division multiplexing data signals of N channels, i.e., a data signal of a first channel which is an RZ signal having a pulse period $T_1$ and a logic "1" pulse width m and data signals of second to N-th channels which are RZ signals having pulse periods $T_2$ to $T_N$ and logic "1" pulse widths $n_2$ to $n_N$ respectively, the values m and $n_2$ to $n_N$ satisfying the relation $\max(n_2 \text{ to } n_N)<m$ in which $\max(n_2 \text{ to } n_N)$ is a maximum one of the values $n_2$ to $n_N$, the signal separating method including a first differentiating step receiving the multiplexed signal D with the data signal of the first channel as logic "1", detecting a leading edge of logic "1" of the data signal of each channel and outputting a first pulse signal P1 indicating timing thereof, a pulse widening step outputting a second pulse signal P2 with each pulse of the first pulse signal P1 as a trigger so that a pulse width k of each pulse of the second pulse signal P2 satisfies a condition $$\max(n_2 \text{ to } n_N)<k<\min(m,T_2 \text{ to } T_N)$$

in which $\min(m, T_2 \text{ to } T_N)$ is a smallest one of m and $T_2$ to $T_N$, a marker signal generating step judging whether the multiplexed signal D is logic "1" or logic "0" at timing of a trailing edge of the second pulse signal P2, and outputting a marker signal L1 indicating timing of the data signal of the first channel when the multiplexed signal D is logic "1", first to (N−1)-th latch pulse generating steps generating first to (N−1)-th latch pulses having such pulse widths that trailing edges of the first to (N−1)-th latch pulses are located within pulse widths of the data signals of the second to N-th channels with the marker signal L1 as a base point, and first to (N−1)-th latch steps latching the multiplexed signal D at the trailing edges of the first to (N−1)-th latch pulses and outputting the latched signals as the data signals D2 to DN of the second to N-th channels.

A fifth invention provides a signal multiplexing circuit for receiving data signals of first and second channels which are RZ signals, and generating a multiplexed signal obtained by time-division multiplexing the data signals of the two channels at a repetition period T of the two channels, wherein the data signals of the two channels are generated and time-division multiplexed so that a minimum value of a "Hi" level period n and "Lo" level periods $(T_1-m)$ and $(T_2-n)$ is not smaller than a predetermined value while n<m is satisfied when $T_1$ is a pulse period of the data signal of the first channel, m is a logic "1" pulse width of the data signal of the first channel, $T_2$ is a pulse period of the data signal of the second channel, n is a logic "1" pulse width of the data signal of the second channel in case of $T=T_1+T_2$.

A sixth invention provides a signal multiplexing circuit for receiving data signals of first to N-th channels (N is an integer not smaller than 3) which are RZ signals, and generating a multiplexed signal obtained by time-division multiplexing the data signals of the N channels at a repetition period T of the N channels, wherein the data signals of the N channels are generated and time-division multiplexed so that a minimum value of "Hi" level periods $n_2$ to $n_N$ and "Lo" level periods $(T_1-m)$ and $(T_2-n_2)$ to $(T_N-n_N)$ is not smaller than a predetermined value while a maximum value of $n_2$ to $n_N$ is smaller than m when $T_1$ is a pulse period of the data signal of the first channel, m is a logic "1" pulse width of the data signal of the first channel, $T_2$ to $T_N$ are pulse periods of the data signals of the second to N-th channels, $n_2$ to $n_N$ are logic "1" pulse widths of the data signals of the second to N-th channels in case of $T=T_1+T_2+\ldots+T_N$.

In the fifth and sixth inventions, configuration may be made so that each of the "Hi" level period and the "Lo" level period of the data signal of one channel is set at the predetermined value. Or configuration may be made so that each of the "Lo" level periods of the data signals of all channels is set at the predetermined value. In the signal multiplexing circuit according to the fifth invention or the sixth invention, the predetermined value may be a value decided by characteristic of an optical signal transmitter-receiver which transmits and receives a data signal of each channel, which is a 1-bit quantized signal, as an optical signal.

A seventh invention provides a signal multiplexing method for receiving data signals of first and second channels which are RZ signals, and generating a multiplexed signal obtained by time-division multiplexing the data signals of the two channels at a repetition period T of the two channels, wherein the data signals of the two channels are generated and time-division multiplexed so that a minimum value of a "Hi" level period n and "Lo" level periods $(T_1-m)$ and $(T_2-n)$ is not smaller than a predetermined value while n<m is satisfied when $T_1$ is a pulse period of the data signal of the first channel, m is a logic "1" pulse width of the data signal of the first channel, $T_2$ is a pulse period of the data signal of the second channel, n is a logic "1" pulse width of the data signal of the second channel in case of $T=T_1+T_2$.

An eighth invention provides a signal multiplexing method for receiving data signals of first to N-th channels (N is an integer not smaller than 3) which are RZ signals, and generating a multiplexed signal obtained by time-division multiplexing the data signals of the N channels at a repetition period T of the N channels, wherein the data signals of the N channels are generated and time-division multiplexed so that a minimum value of "Hi" level periods $n_2$ to $n_N$ and "Lo" level periods $(T_1-m)$ and $(T_2-n_2)$ to $(T_N-n_N)$ is not smaller than a predetermined value while a maximum value of $n_2$ to $n_N$ is smaller than m when $T_1$ is a pulse period of the data signal of the first channel, m is a logic "1" pulse width of the data signal of the first channel, $T_2$ to $T_N$ are pulse periods of the data signals of the second to N-th channels, $n_2$ to $n_N$ are logic "1" pulse widths of the data signals of the second to N-th channels in case of $T=T_1+T_2+\ldots+T_N$.

Effect

The signal separating circuit according to the present invention can separate signals of respective channels from a multiplexed signal by using only logic circuits without use of a clock generated by a CDR circuit including a VCO large in electric power consumption and a PLL long in lead-in time. Accordingly, electric power consumption can be reduced remarkably. Signal separation can be made at a high response speed because synchronous lead-in as in the PLL is not required. Particularly in the case of separation to two channels, signal separation can be made easily by a simple method of making the pulse widths of RZ data signals of respective channels different from one another.

The signal multiplexing circuit according to the present invention can generate a multiplexed signal in which a minimum value of the "Hi" level period and the "Lo" level period of each channel is not smaller than a predetermined value without necessity of making the pulse periods of respective channels uniform. Particularly when data signals (e.g. 1-bit quantized signals) of respective channels are multiplexed to be transmitted and received as an optical signal, the "Hi" level period and the "Lo" level period of each channel can be set to be not smaller than a predetermined value in accordance with characteristic of an optical signal transmitter-receiver to thereby make it possible to generate a multiplexed signal in accordance with the characteristic of the optical signal transmitter-receiver. Accordingly, the speed limit of the optical signal transmitter-receiver can be relaxed so that reduction in the cost can be achieved.

Moreover, in the signal multiplexing circuit and the signal separating circuit according to the invention, the "Hi" level periods and the "Lo" level periods of N channels can be optimized so that the "Hi" level periods of the N channels can be set to be wide while a "Hi" level period difference allowed to be separated as the "Hi" level period of each channel is kept. Accordingly, the margin for separating the multiplexed signal can be widened to thereby cope with a variation of pulse width of the multiplexed signal, so that the multiplexed signal can be separated into respective channels easily.

DETAILED DESCRIPTION OF THE EMBODIMENTS

First Embodiment of Signal Separating Circuit

Figure 1:
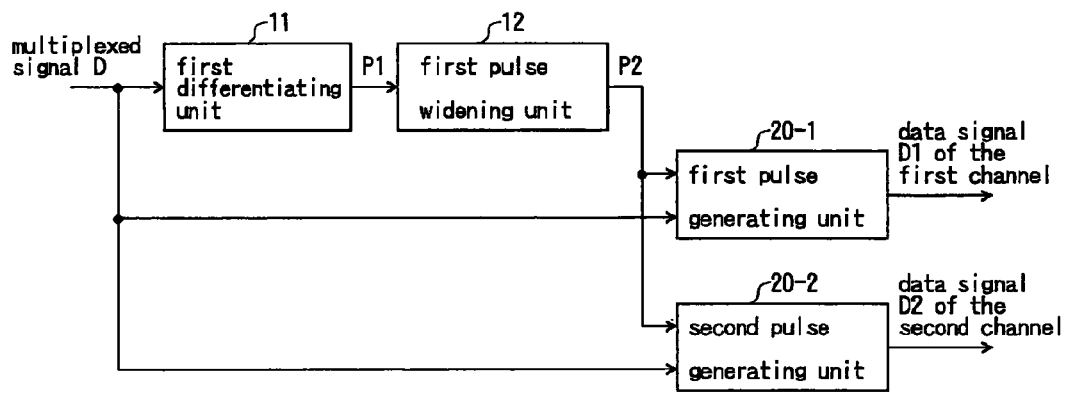
FIG. 1 is a diagram showing an example of configuration of a first embodiment of a signal separating circuit according to the invention.
Figure 2:
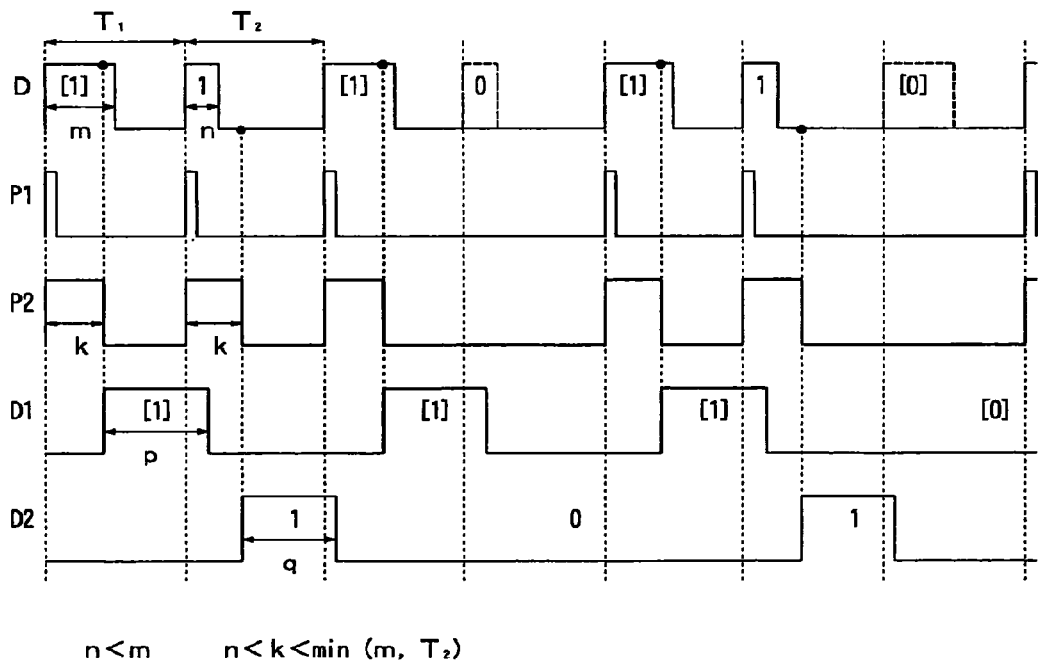
FIG. 2 is a time chart showing an example of the operation of the first embodiment of the signal separating circuit according to the invention.

FIG. 1 shows an example of configuration of a first embodiment of a signal separating circuit according to the present invention. FIG. 2 is a time chart showing an example of the operation of the first embodiment of the signal separating circuit according to the invention. The abscissa axis in FIG. 2 expresses time.

Figure 22:
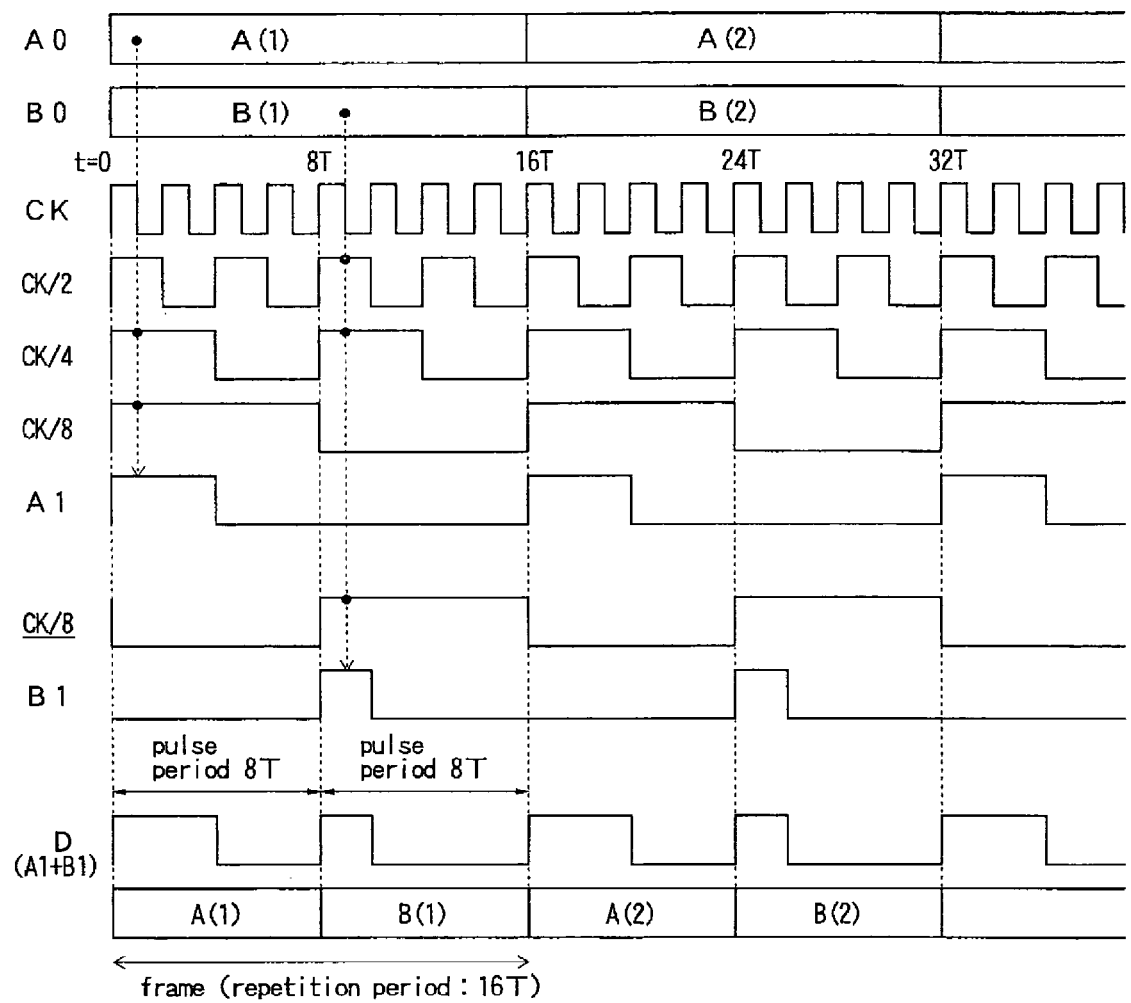
FIG. 22 is a time chart showing an example of the operation of the signal multiplexing circuit according to the background art.
Figure 23:
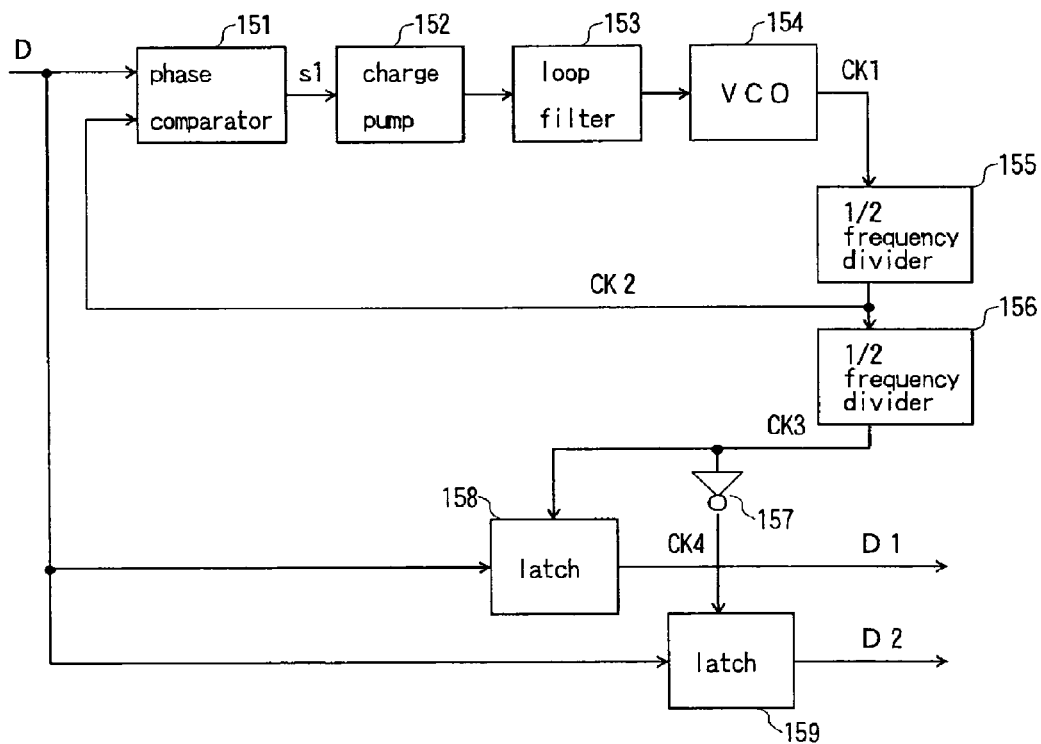
FIG. 23 is a diagram showing an example of configuration of a background-art signal separating circuit for separating a 2-channel multiplexed signal.
Figure 24:
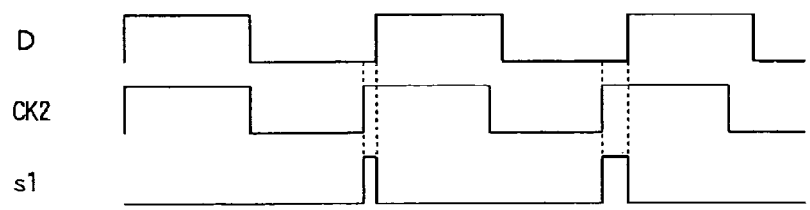
FIG. 24 is a time chart showing an example of the operation of a CDR circuit.
Figure 25:
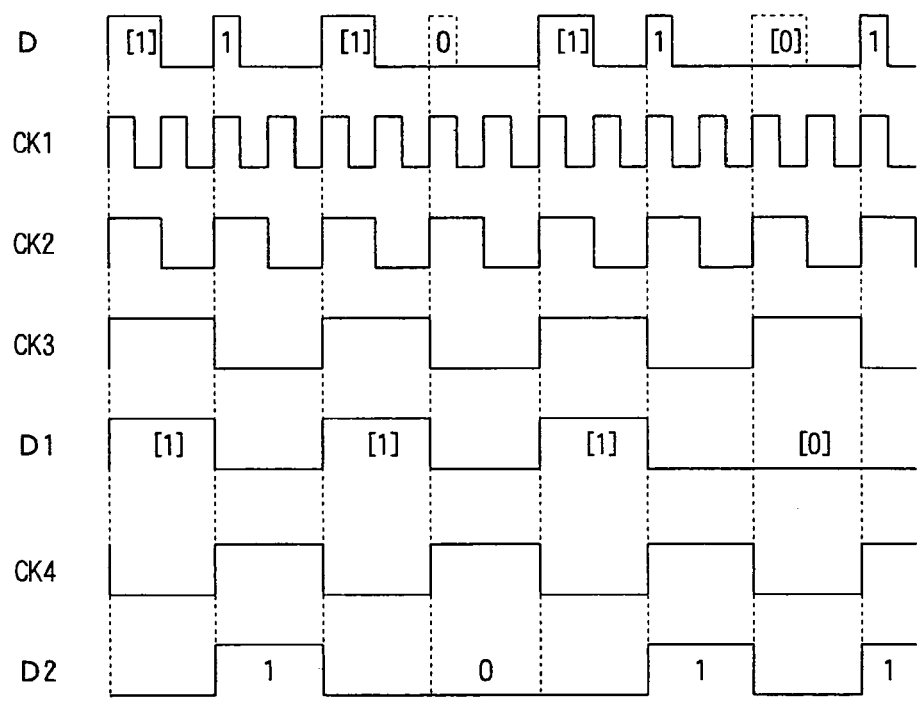
FIG. 25 is a time chart showing an example of the operation of the signal separating circuit according to the background art.
Figure 26:
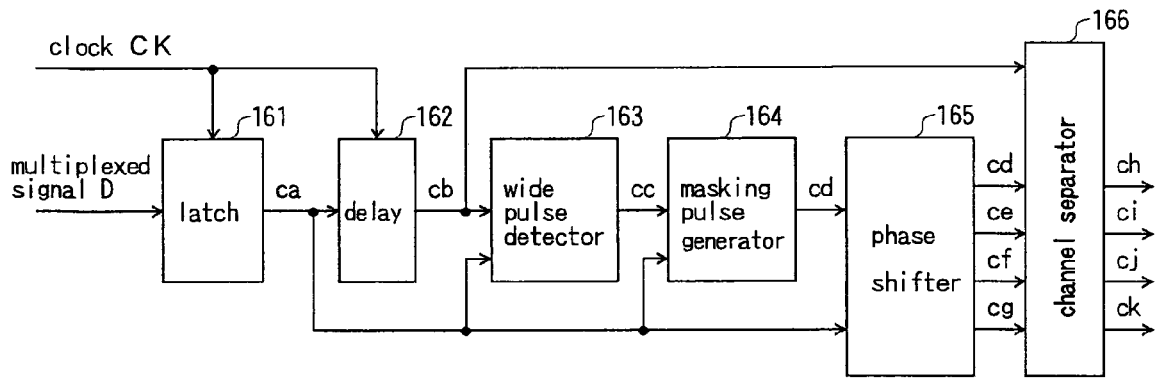
FIG. 26 is a diagram showing an example of configuration of a background-art signal separating circuit for separating a 4-channel multiplexed signal.
Figure 27:
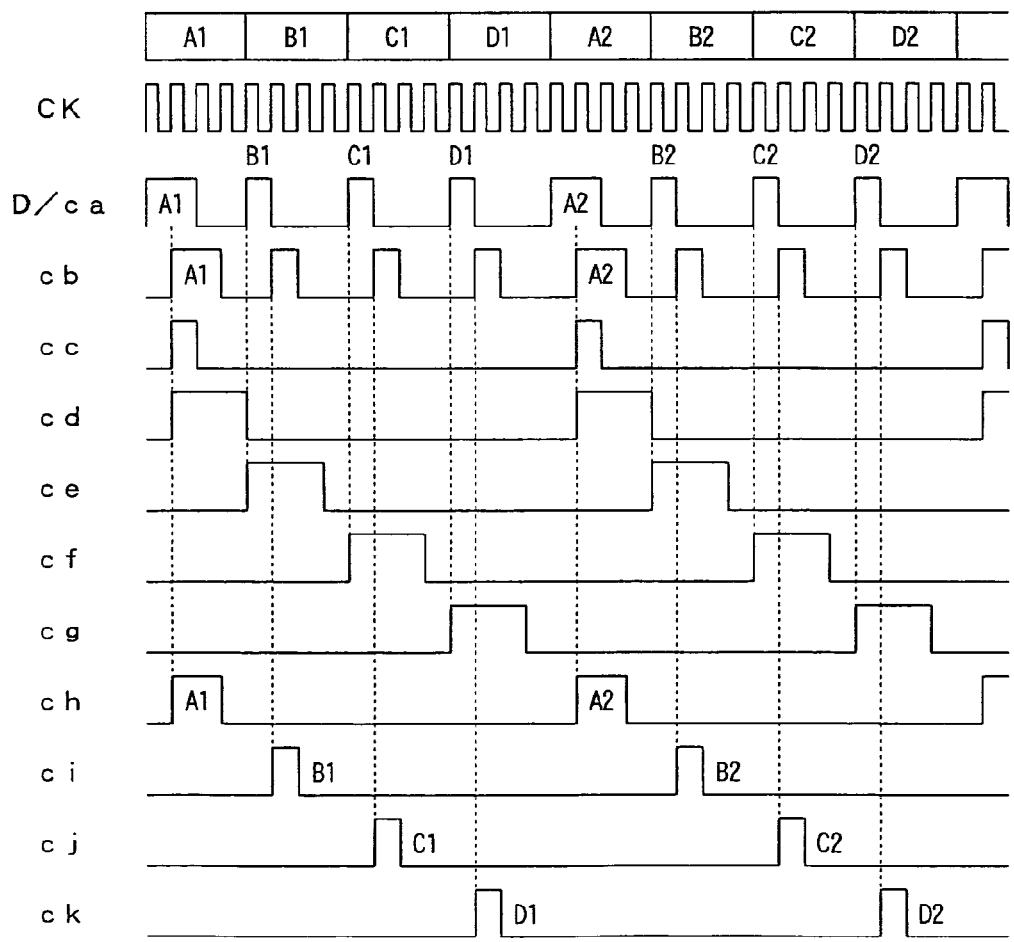
FIG. 27 is a time chart showing an example of the operation of the signal separating circuit according to the background art.

This embodiment will be described about the case where a multiplexed signal D obtained by time-division multiplexing RZ data signals of two channels is input so as to be separated into an RZ data signal D1 of the first channel and an RZ data signal of the second channel. The RZ data signal of the first channel in the multiplexed signal D has a pulse period $T_1$ and a logic "1" pulse width m. The RZ data signal of the second channel in the multiplexed signal D has a pulse period $T_2$ and a logic "1" pulse width n. Incidentally, the relation (n<m) is satisfied so that the difference between these pulse widths is used for separating the RZ data signals of two channels. Although the pulse periods $T_1$ and $T_2$ and pulse widths m and n of the respective channels satisfy the relation $T_1=T_2=8$ T, m=4 T and n=2 T in an example of the multiplexed signal shown in FIG. 22, the pulse periods $T_1$ and $T_2$ are not limited to $T_1=T_2$ as will be described below.

In FIGS. 1 and 2, a first differentiating unit 11 receives the multiplexed signal D as an input and generates a pulse signal P1 with a narrow pulse width in accordance with timing of a leading edge (front edge) of each pulse of the multiplexed signal D. A first pulse widening unit 12 receives the pulse signal P1 and generates a pulse signal P2 with a pulse width k obtained by widening the pulse width of each pulse of the pulse signal P1. Here, the pulse width k is set in the condition $$n<k<\min(m,T_2)$$

in which min(m, $T_2$) is a smaller one of m and $T_2$.

A first pulse generating unit 20-1 receives the multiplexed signal D and the pulse signal P2, judges whether the multiplexed signal D has logic "1" or logic "0" at timing of a trailing edge (rear edge) of the pulse signal P2, generates a pulse signal with a pulse width p when the multiplexed signal D has logic "1", and outputs the pulse signal as an RZ data signal D1 of the first channel. Since the pulse period of the RZ data signal D1 is $(T_1+T_2)$, the pulse width p is set appropriately within the range.

A second pulse generating unit 20-2 receives the multiplexed signal D and the pulse signal P2, judges whether the multiplexed signal D has logic "1" or logic "0" at timing of a trailing edge of the pulse signal P2, generates a pulse signal with a pulse width q when the multiplexed signal D has logic "0", and outputs the pulse signal as an RZ data signal D2 of the second channel. Since the pulse period of the RZ data signal D2 is $(T_1+T_2)$, the pulse width q is set appropriately within the range.

Figure 3:
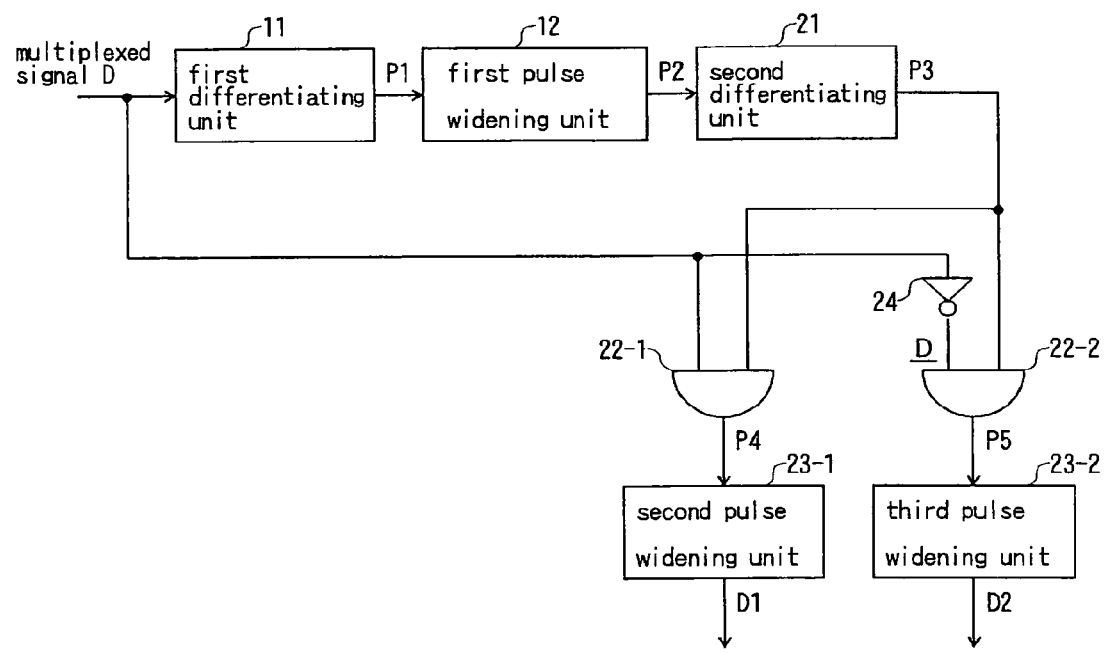
FIG. 3 is a diagram showing a specific example 1 of the first embodiment of the signal separating circuit according to the invention.
Figure 4:
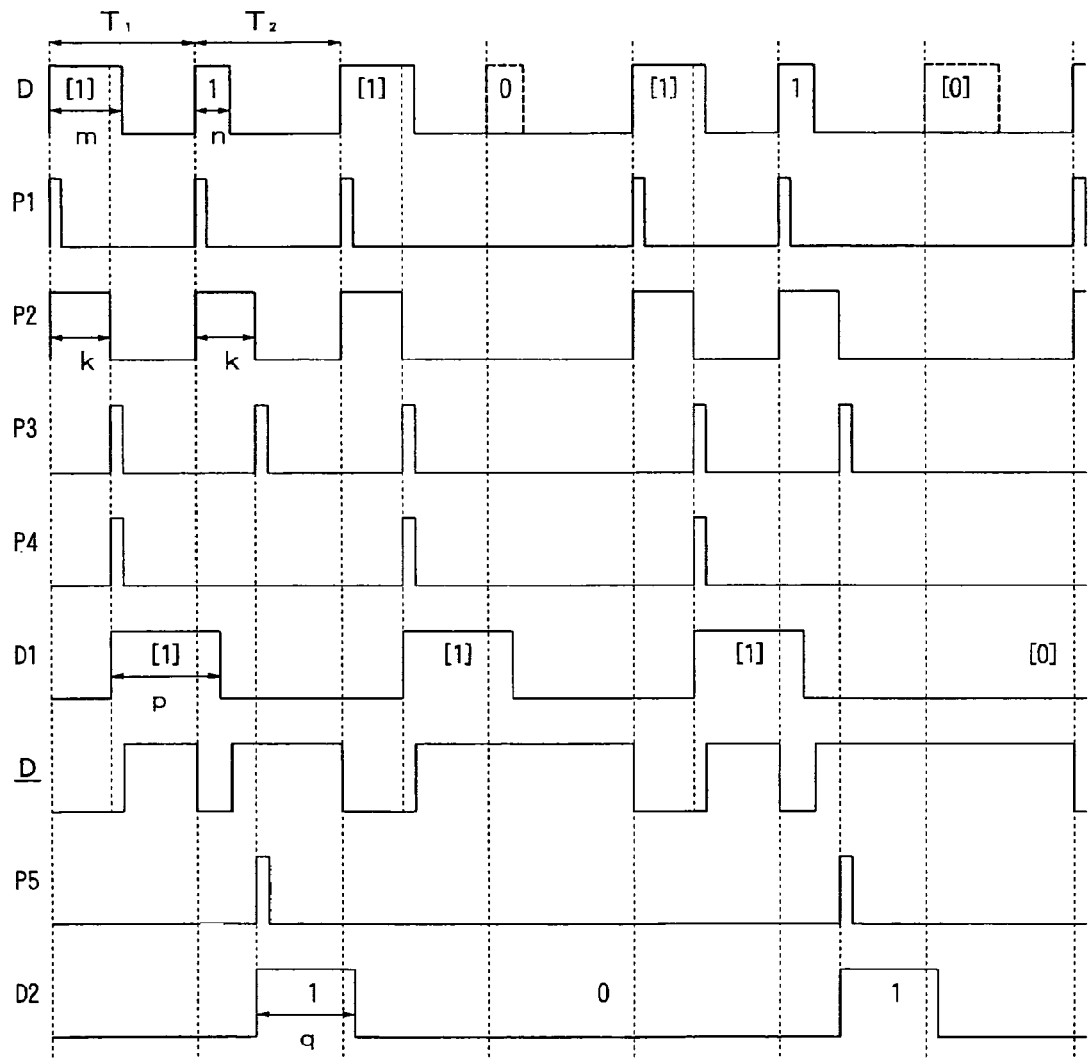
FIG. 4 is a time chart showing an example of the operation of the specific example 1.

FIG. 3 shows a specific example 1 of the first embodiment of the signal separating circuit according to the invention. FIG. 4 is a time chart showing an example of the operation of the specific example 1. The abscissa axis in FIG. 4 expresses time.

In FIGS. 3 and 4, a first differentiating unit 11 and a first pulse widening unit 12, which are the same as those shown in FIGS. 1 and 2, receive the multiplexed signal D and generate a pulse signal P2 with a pulse width k.

A second differentiating unit 21, an AND unit 22-1 and a second pulse widening unit 23-1 correspond to the first pulse generating unit 20-1 shown in FIG. 1. The second differentiating unit 21, an AND unit 22-2, a third pulse widening unit 23-2 and an inverter unit 24 correspond to the second pulse generating unit 20-2 shown in FIG. 1. Although the second differentiating unit 21 is shared herein, two differentiating units may be provided individually.

The second differentiating unit 21 receives the pulse signal P2 and generates a pulse signal P3 with a narrow pulse width in accordance with timing of a training edge of each pulse of the pulse signal P2. The pulse signal P3 is replicated to form two pulse signals P3 so as to be input to one input terminal of the AND unit 22-1 and one input terminal of the AND unit 22-2 respectively. The AND unit 22-1 receives the multiplexed signal D at the other input terminal, ANDs the multiplexed signal D and the pulse signal P3 and outputs an ANDed signal P4 corresponding to the logic "1" of the data signal of the first channel. The second pulse widening unit 23-1 receives the ANDed signal P4, generates a pulse signal with a pulse width p and outputs the pulse signal as a data signal D1 of the first channel.

On the other hand, the AND unit 22-2 receiving the pulse signal P3 receives an inverted multiplexed signal $\overline{D}$ obtained by logically inverting the multiplexed signal D through the inverter unit 24, at the other input terminal, ANDs the inverted multiplexed signal $\overline{D}$ and the pulse signal P3 and outputs an ANDed signal P5 corresponding to the logic "1" of the data signal of the second channel. The third pulse widening unit 23-2 receives the ANDed signal P5, generates a pulse signal with a pulse width q and outputs the pulse signal as a data signal D2 of the second channel.

In this manner, the multiplexed signal D and the inverted multiplexed signal $\overline{D}$ are latched by the pulse signal P3 so that the data signal D1 of the first channel and the data signal D2 of the second channel can be separately output from the second pulse widening unit 23-1 and the third pulse widening unit 23-2 respectively.

Figure 5:
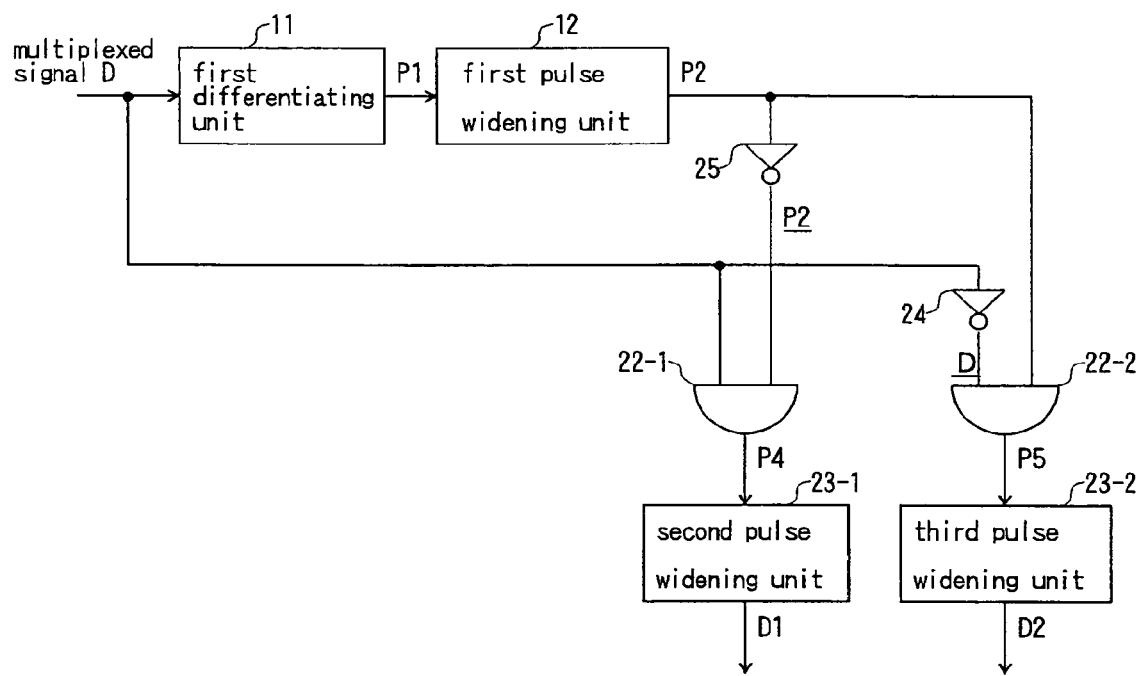
FIG. 5 is a diagram showing a specific example 2 of the first embodiment of the signal separating circuit according to the invention.
Figure 6:
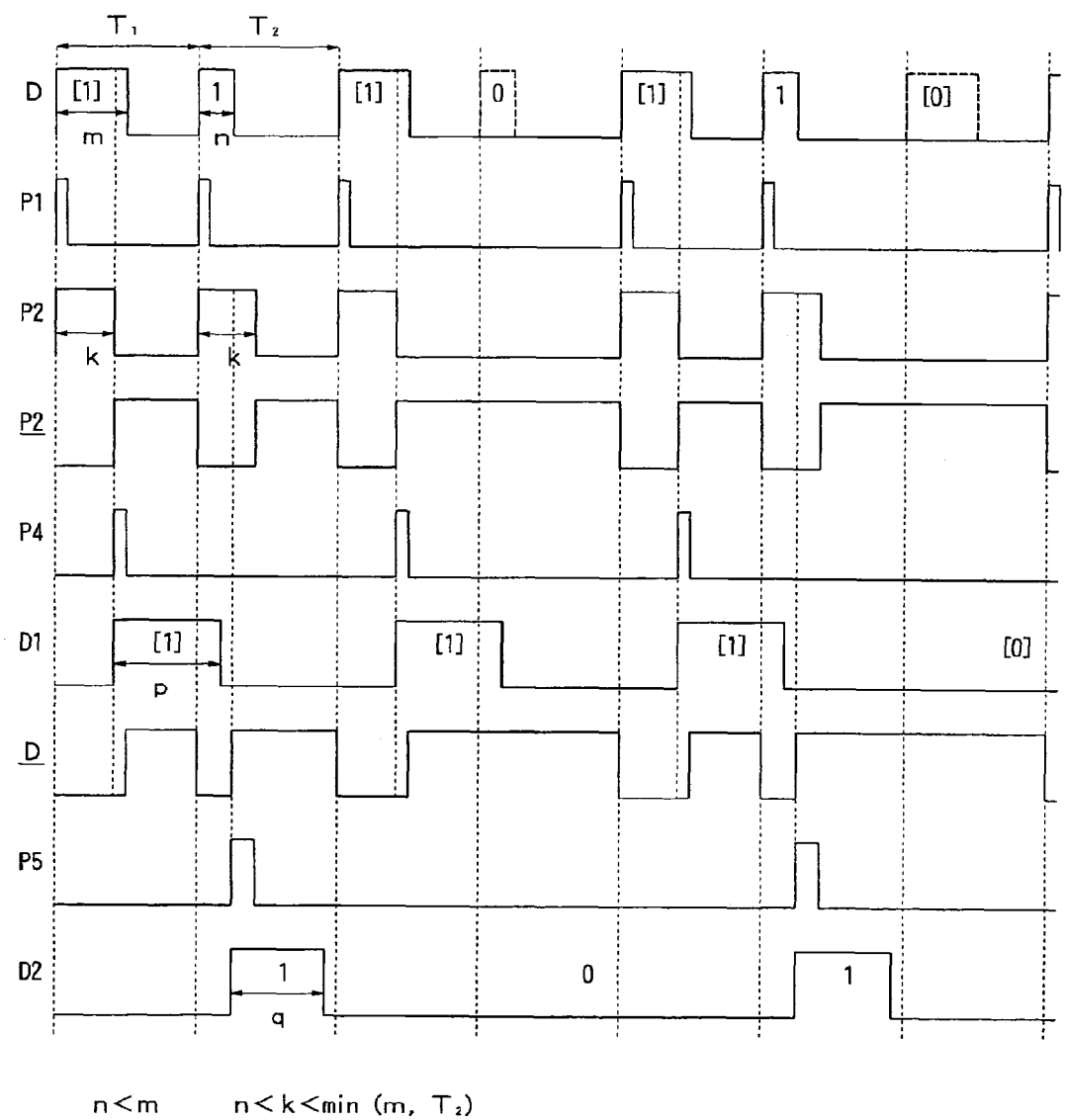
FIG. 6 is a time chart showing an example of the operation of the specific example 2.

FIG. 5 shows a specific example 2 of the first embodiment of the signal separating circuit according to the invention. FIG. 6 is a time chart showing an example of the operation of the specific example 2. The abscissa axis herein expresses time.

In FIGS. 5 and 6, a first differentiating unit 11 and a first pulse widening unit 12, which are the same as those shown in FIGS. 1 and 2, receive the multiplexed signal D and generate a pulse signal P2 with a pulse width k.

An inverter unit 25, an AND unit 22-1 and a second pulse widening unit 23-1 correspond to the first pulse generating unit 20-1 shown in FIG. 1. An AND unit 22-2, a third pulse widening unit 23-2 and an inverter unit 24 correspond to the second pulse generating unit 20-2 shown in FIG. 1.

The pulse signal P2 is replicated to form two pulse signals P2, one of which is logically inverted into an inverted pulse signal $\overline{P2}$ by the inverter unit 25. The inverted pulse signal $\overline{P2}$ is input to one input terminal of the AND unit 22-1. The other pulse signal P2 is input to one input terminal of the AND unit 22-2. The AND unit 22-1 receives the multiplexed signal D at the other input terminal, ANDs the multiplexed signal D and the inverted pulse signal $\overline{P2}$ and outputs an ANDed signal P4 corresponding to the logic "1" of the data signal of the first channel. The second pulse widening unit 23-1 receives the ANDed signal P4, generates a pulse signal with a pulse width p and outputs the pulse signal as a data signal D1 of the first channel.

On the other hand, the AND unit 22-2 receiving the pulse signal P2 receives an inverted multiplexed signal $\overline{D}$ obtained by logically inverting the multiplexed signal D through the inverter unit 24, at the other input terminal, ANDs the inverted multiplexed signal $\overline{D}$ and the pulse signal P2 and outputs an ANDed signal P5 corresponding to the logic "1" of the data signal of the second channel. The third pulse widening unit 23-2 receives the ANDed signal P5, generates a pulse signal with a pulse width q and outputs the pulse signal as a data signal D2 of the second channel.

In this manner, the multiplexed signal D is latched by the inverted pulse signal $\overline{P2}$ while the inverted multiplexed signal $\overline{D}$ is latched by the pulse signal P2, so that the data signal D1 of the first channel and the data signal D2 of the second channel can be separately output from the second pulse widening unit 23-1 and the third pulse widening unit 23-2 respectively.

Second Embodiment of Signal Separating Circuit

Figure 7:
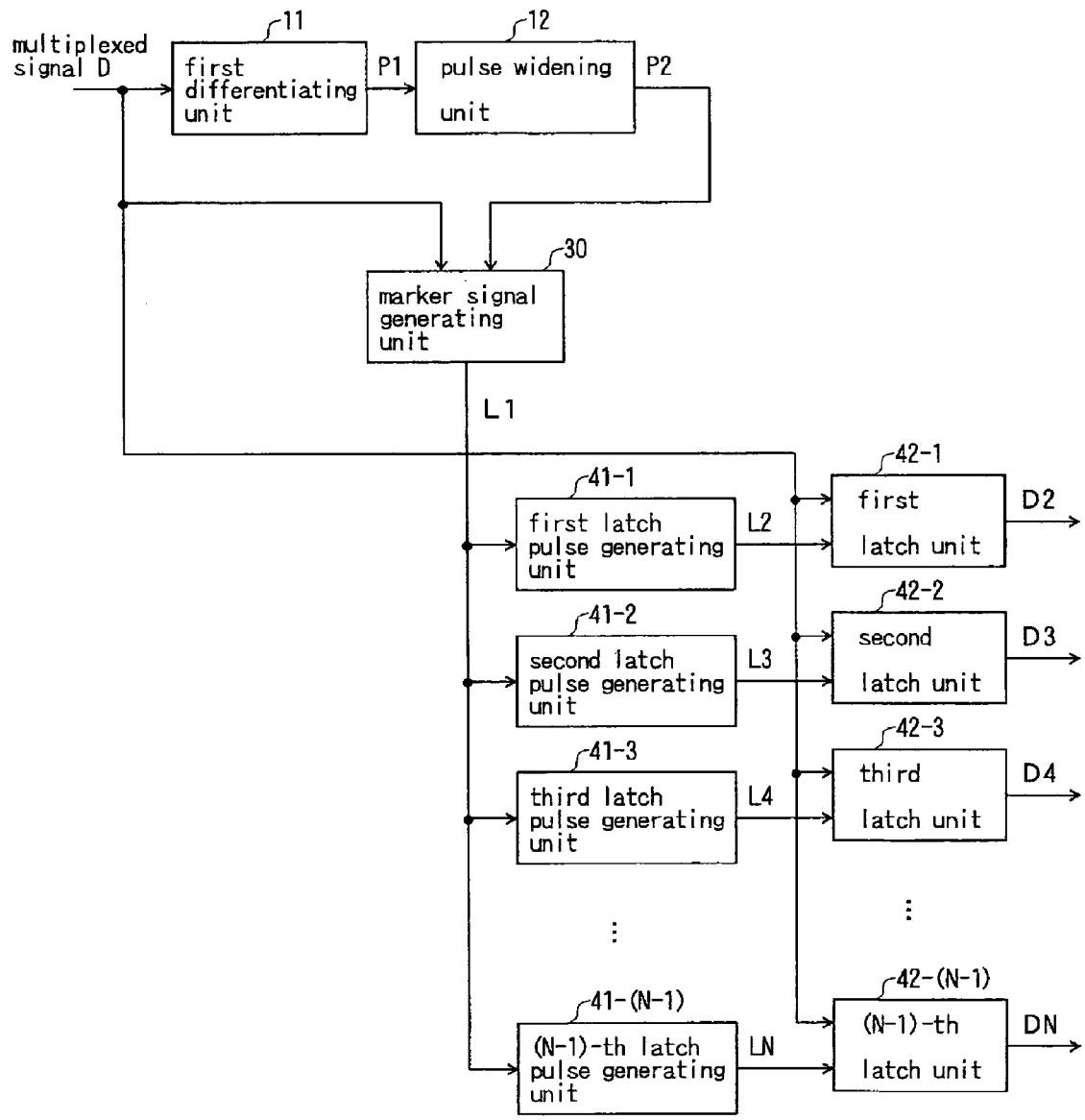
FIG. 7 is a diagram showing an example of configuration of a second embodiment of the signal separating circuit according to the invention.
Figure 8:
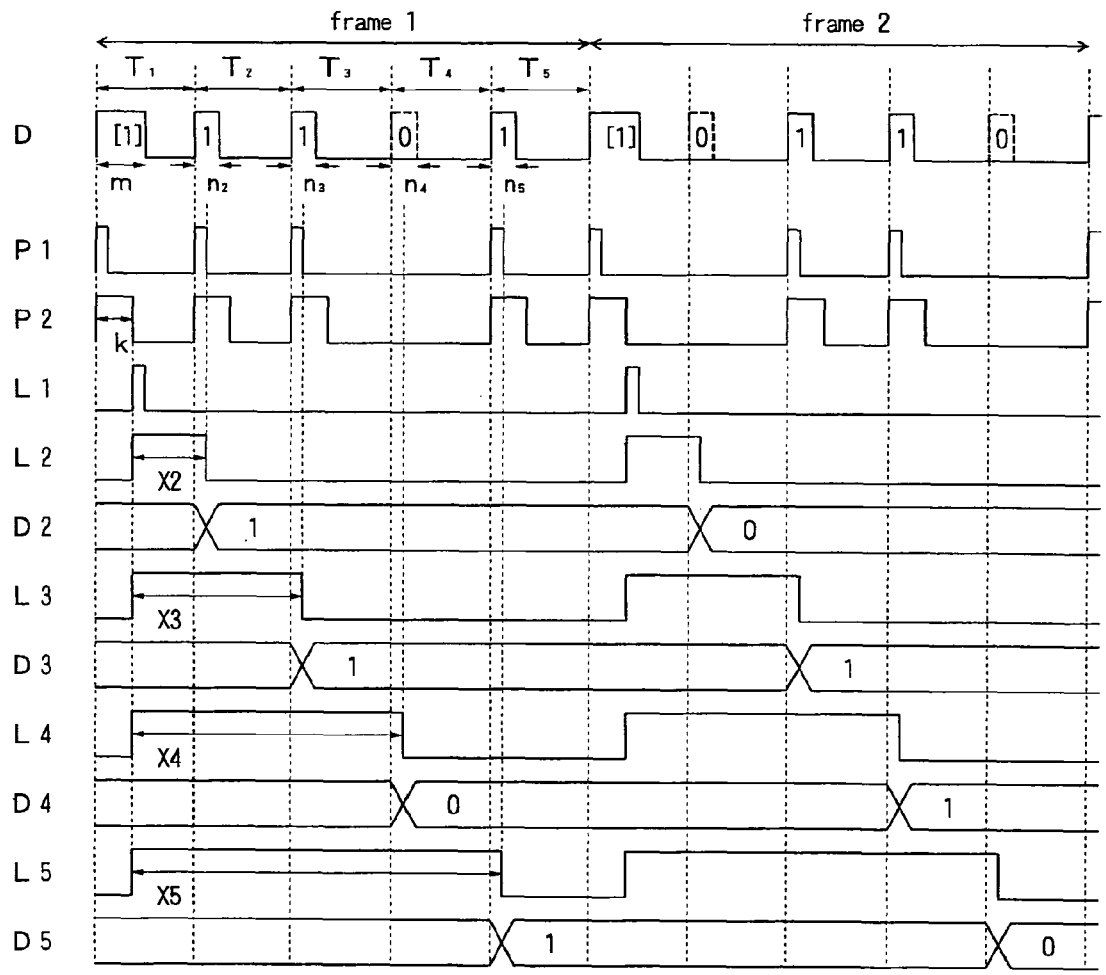
FIG. 8 is a time chart showing an example of the operation of the second embodiment of the signal separating circuit according to the invention.

FIG. 7 shows an example of configuration of a second embodiment of the signal separating circuit according to the invention. FIG. 8 is a time chart showing an example of the operation of the second embodiment of the signal separating circuit according to the invention. The abscissa axis in FIG. 8 expresses time.

This embodiment will be described about the case where a multiplexed signal D obtained by time-division multiplexing RZ data signals of N channels (N is an integer not smaller than 3) is input so as to be separated into RZ data signals D2 to DN of the second to N-th channels. Incidentally, N=5 in FIG. 8. The RZ data signal of the first channel in the multiplexed signal D is always logic "1" and has a pulse period $T_1$ and a pulse width m. The RZ data signals of the second to N-th channels in the multiplexed signal D have pulse periods $T_2$ to $T_N$ and logic "1" pulse widths $n_2$ to $n_N$, respectively. Incidentally, m and $n_2$ to $n_N$ satisfy the condition $$\max(n_2 \text{ to } n_N) < m$$

in which $\max(n_2 \text{ to } n_N)$ is the maximum value of $n_2$ to $n_N$.

In FIGS. 7 and 8, a first differentiating unit 11 receives the multiplexed signal D and generates a pulse signal P1 with a narrow pulse width in accordance with timing of a leading edge of each pulse of the multiplexed signal D. A first pulse widening unit 12 receives the pulse signal P1 and generates a pulse signal P2 with a pulse width k by widening the pulse width of each pulse of the pulse signal P1. Here, the pulse width k is set in the condition $$\max(n_2 \text{ to } n_N) < k < \min(m, T_2 \text{ to } T_N)$$

in which $\min(m, T_2 \text{ to } T_N)$ is the minimum value of m and $T_2$ to $T_N$.

A marker signal generating unit 30 receives the multiplexed signal D and the pulse signal P2, judges whether the multiplexed signal D has logic "1" or logic "0" at timing of a trailing edge of the pulse signal P2, and outputs a marker signal L1 indicating timing of the RZ data signal of the first channel when the multiplexed signal D has logic "1". First to (N−1)-th latch pulse generating units 41-1 to 41-(N−1) receive the marker signal L1 and generate latch pulses L2 to LN which have such pulse widths X2 to XN that trailing edges of the latch pulses L2 to LN are located within the pulse widths of the RZ data signals of the second to N-th channels respectively with the input timing of the marker signal L1 as a base point. In FIG. 8, the respective pulse widths X2 to X5 of the latch pulses L2 to L5 are, for example, defined as follows.

$$X2 = T_1 - k + n_2/2$$

$$X3 = T_1 - k + T_2 + n_3/2$$

$$X4 = T_1 - k + T_2 + T_3 + n_4/2$$

$$X5 = T_1 - k + T_2 + T_3 + T_4 + n_5/2$$

First to (N−1)-th latch units 42-1 to 42-(N−1) receive the multiplexed signal D and the respective latch pulses L2 to LN, latch the multiplexed signal D at trailing edges of the latch pulses L2 to LN and output the latched signals as data signals D2 to DN of the second to N-th channels, respectively.

Figure 9:
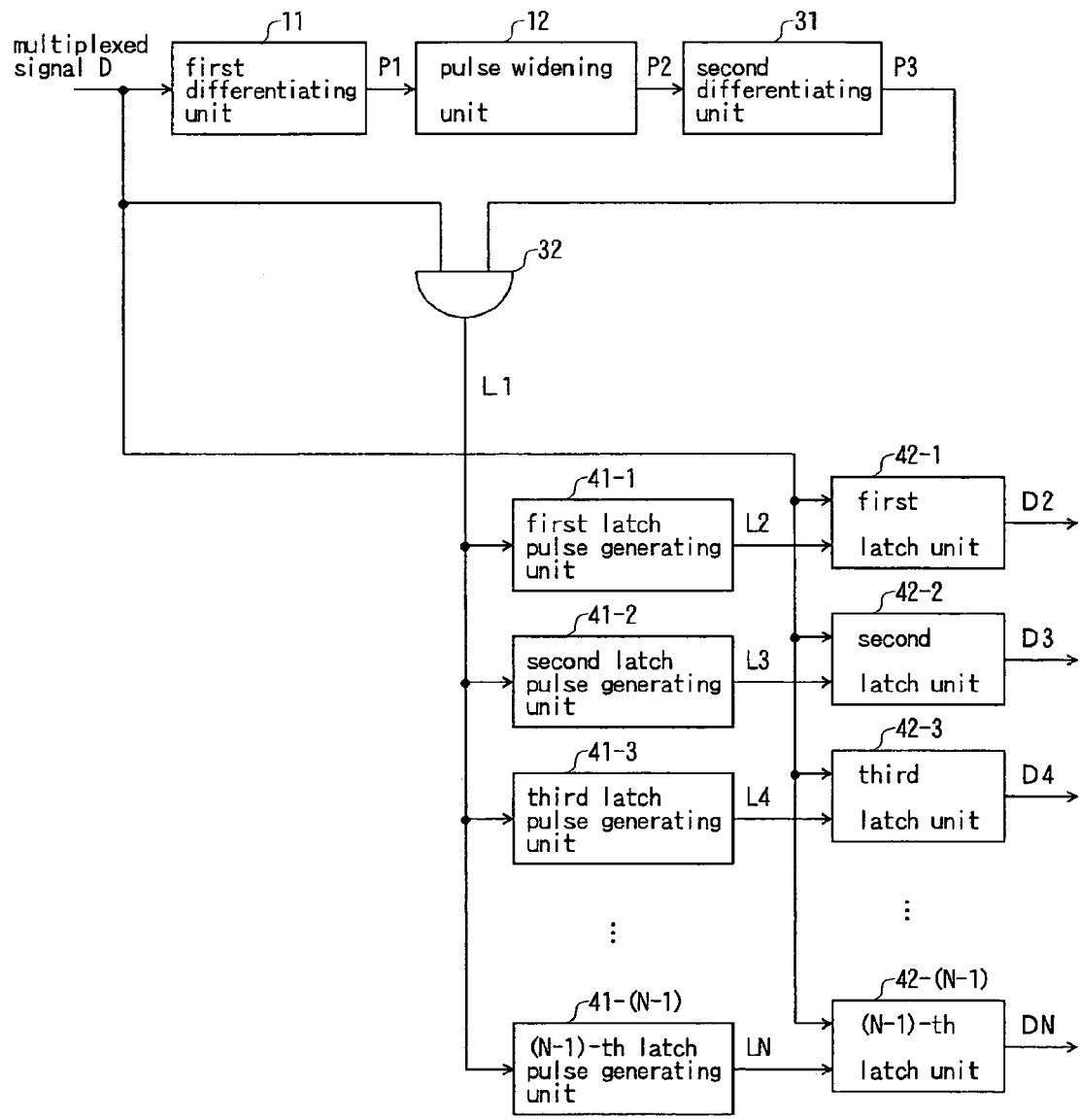
FIG. 9 is a diagram showing a specific example 1 of the second embodiment of the signal separating circuit according to the invention.

FIG. 9 shows a specific example 1 of the second embodiment of the signal separating circuit according to the invention. In FIG. 9, a first differentiating unit 11 and a first pulse widening unit 12, which are the same as those shown in FIGS. 7 and 8, receive the multiplexed signal D and generate a pulse signal P2 with a pulse width k.

A second differentiating unit 31 and an AND unit 32 correspond to the marker signal generating unit 30 shown in FIG. 7. The second differentiating unit 31 receives the pulse signal P2 and generates a pulse signal P3 with a narrow pulse width in accordance with timing of a trailing edge of each pulse of the pulse signal P2. The pulse signal P3 is input to one input terminal of the AND unit 32. The AND unit 32 receives the multiplexed signal D at the other input terminal, ANDs the multiplexed signal D and the pulse signal P3 and outputs a marker signal L1 corresponding to the logic "1" of the data signal of the first channel. Hereinafter, the multiplexed signal D is latched by latch pulses L2 to LN generated with the marker signal L1 as a base point in the same manner as in the configuration shown in FIG. 7, so that the data signals D2 to DN of the second to N-th channels can be output separately.

Figure 10:
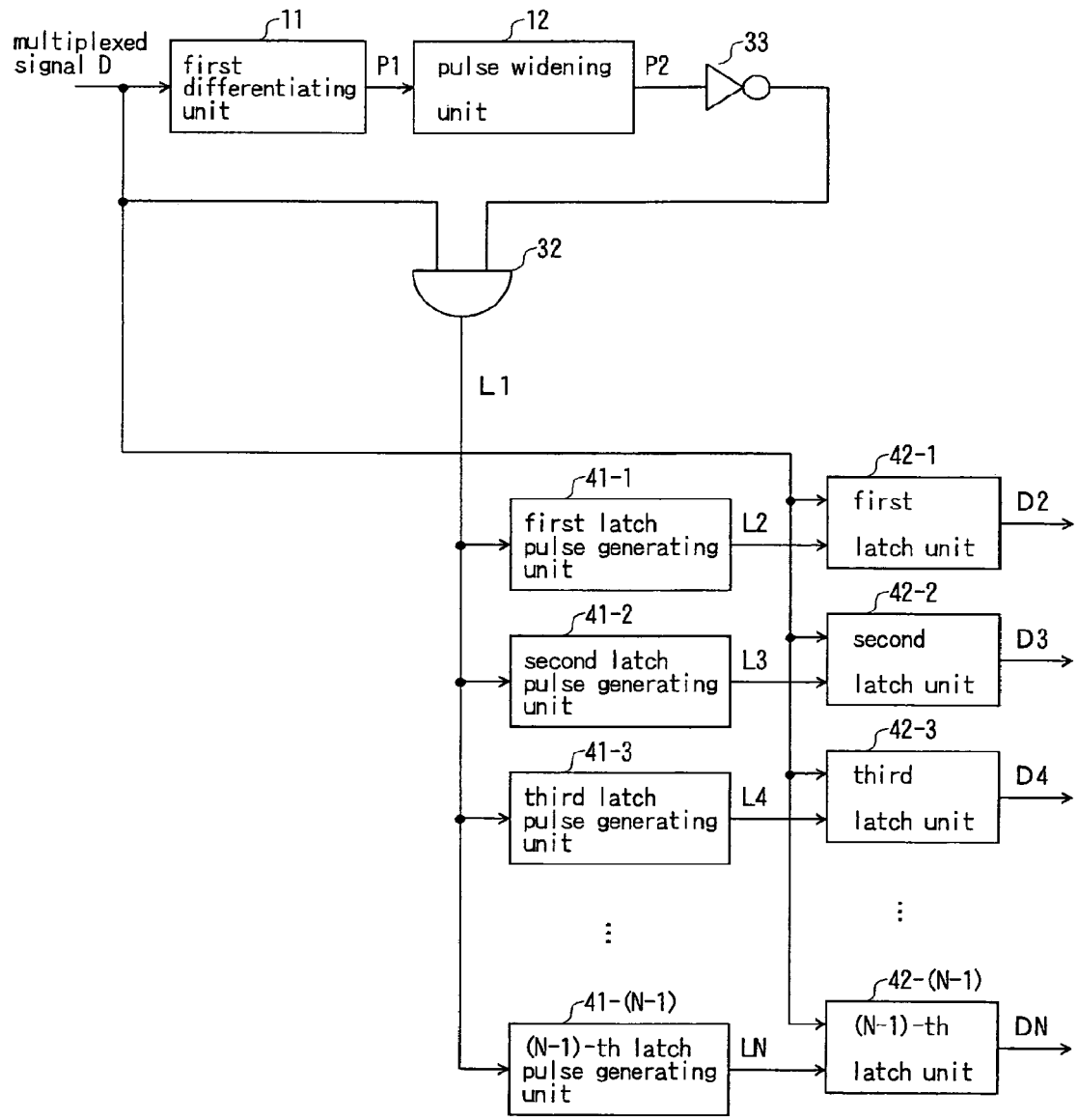
FIG. 10 is a diagram showing a specific example 2 of the second embodiment of the signal separating circuit according to the invention.

FIG. 10 shows a specific example 2 of the second embodiment of the signal separating circuit according to the invention. In FIG. 10, a first differentiating unit 11 and a first pulse widening unit 12, which are the same as those shown in FIGS. 7 and 8, receive the multiplexed signal D and generate a pulse signal P2 with a pulse width k.

An inverter unit 33 and an AND unit 32 correspond to the marker signal generating unit 30 shown in FIG. 7. The pulse signal P2 is logically inverted into an inverted pulse signal $\overline{P2}$ by the inverter unit 33. The inverted pulse signal $\overline{P2}$ is input to one input terminal of the AND unit 32. The $\overline{\text{AND}}$ unit 32 receives the multiplexed signal D at the other input terminal, ANDs the multiplexed signal D and the inverted pulse signal $\overline{P2}$ and outputs a marker signal L1 corresponding to the logic "1" of the data signal of the first channel. Hereinafter, the multiplexed signal D is latched by latch pulses L2 to LN generated with the marker signal L1 as a base point in the same manner as in the configuration shown in FIG. 7, so that data signals D2 to DN of the second to N-th channels can be output separately.

Example of Configuration of Pulse Widening Units 12 and 23 and Latch Pulse Generating Unit 41

The pulse widening units 12 and 23 used in the first embodiment and the pulse widening unit 12 and the latch pulse generating unit 41 used in the second embodiment can be formed, for example, by using monostable multivibrators. A monostable multivibrator is a circuit which receives a trigger pulse and outputs a pulse with a pulse width corresponding to a time constant achieved by a differentiating or integrating circuit composed of a resistor and a capacitor or by a logic circuit.

Figure 11:
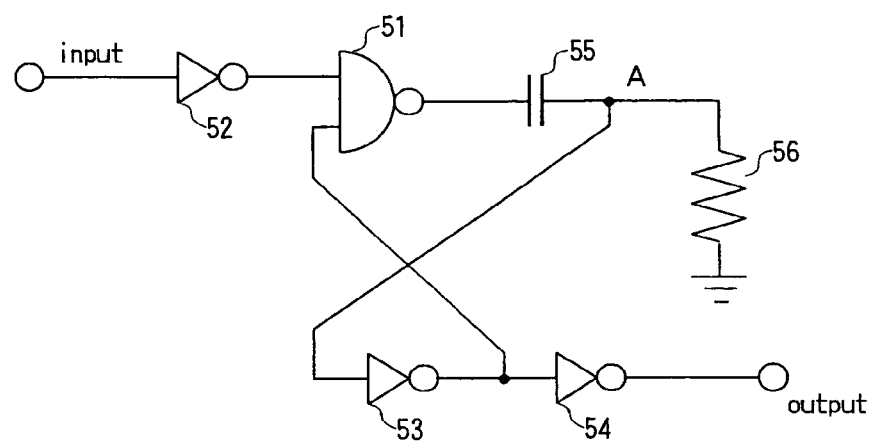
FIG. 11 is a diagram showing an example of configuration of a monostable multivibrator.
Figure 11:
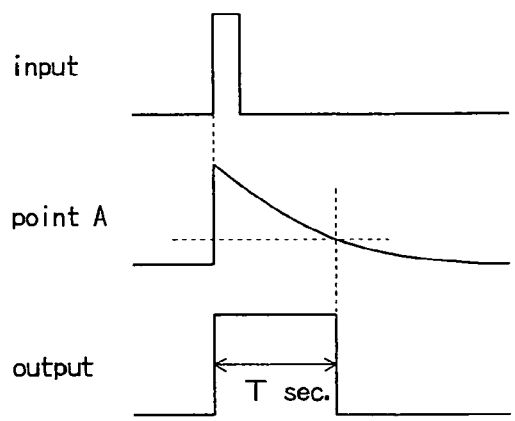

FIG. 11 shows an example of configuration of the monostable multivibrator and an example of the operation thereof. The monostable multivibrator shown as an example in FIG. 11 is configured so that an input terminal, an inverter 52, a NAND 51, a capacitor 55, inverters 53 and 54 and an output terminal are connected successively, a junction A between the capacitor 55 and the inverter 53 is grounded through a resistor 56, and an output of the inverter 53 is replicated to form two outputs so as to be connected to the NAND 51. When a trigger pulse from the input terminal is input to the NAND 51 through the inverter 52, a pulse with a pulse width T corresponding to the time constant (resistance value×capacitance value) of a differentiating circuit composed of the capacitor 55 and the resistor 56 is output at the output terminal. By adjusting the time constant, the monostable multivibrator can serve as the pulse widening units 12 and 23 and the latch pulse generating unit 41 which generate pulses with pulse widths k, p, q and X2 to XN.

Example of Configuration of Differentiating Units 11 and 21

Figure 12:
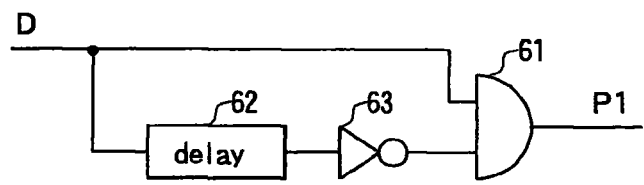
FIG. 12 is a diagram showing an example of configuration of a differentiating circuit 11.
Figure 12:
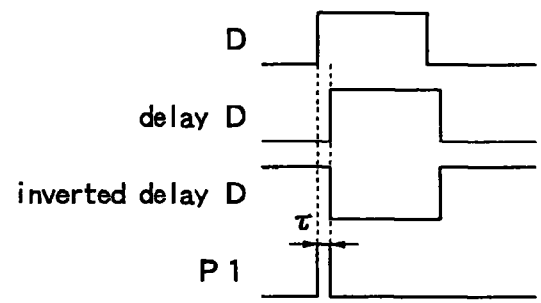

FIG. 12 shows an example of configuration of the differentiating unit 11 and an example of the operation thereof. In FIG. 12, the multiplexed signal D to be input is replicated to form two multiplexed signals D, one of which is input to one input terminal of an AND 61 and the other of which is input to the other input terminal of the AND 61 through a delay 62 and an inverter 63. The AND 61 outputs a pulse signal P1 with a pulse width corresponding to a delay time τ of the delay 62 at a leading edge of the multiplexed signal D.

Figure 13:
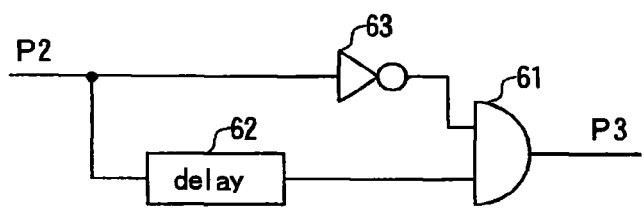
FIG. 13 is a diagram showing an example of configuration of a differentiating circuit 21.
Figure 13:
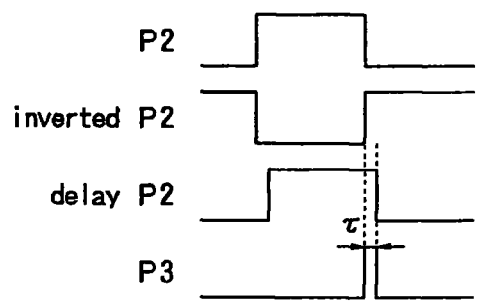

FIG. 13 shows an example of configuration of the differentiating unit 21 and an example of the operation thereof. In FIG. 13, the pulse signal P2 to be input is replicated to form two pulse signals P2, one of which is input to one input terminal of an AND 61 through an inverter 63 and the other of which is input to the other input terminal of the AND 61 through a delay 62. The AND 61 outputs a pulse signal P3 with a pulse width corresponding to a delay time τ of the delay 62 at a trailing edge of the pulse signal P2.

Third Embodiment of Signal Separating Circuit

Figure 14:
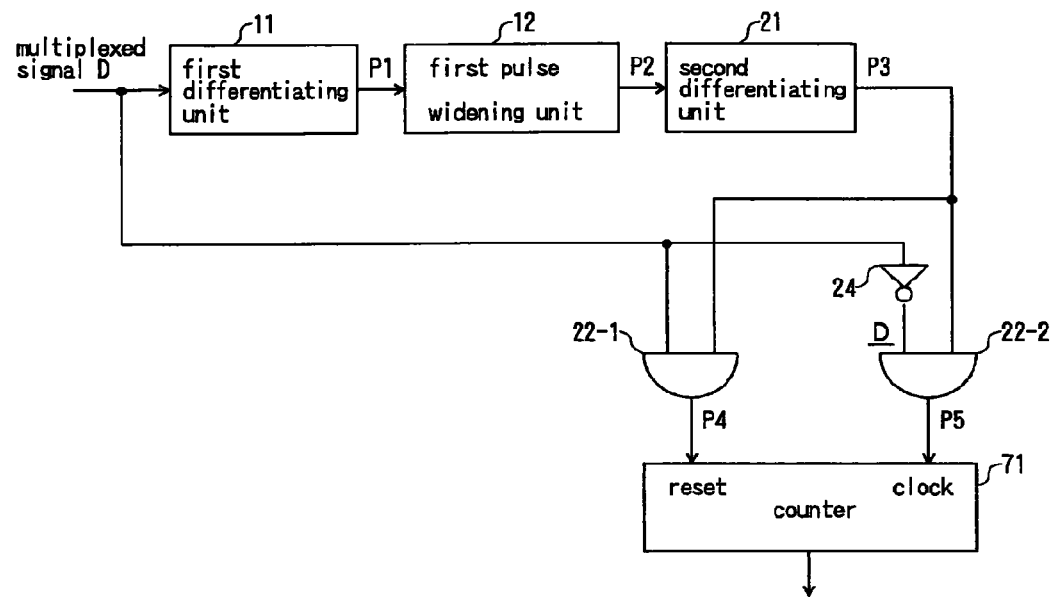
FIG. 14 is a diagram showing an example of configuration of a third embodiment of the signal separating circuit according to the invention.
Figure 15:
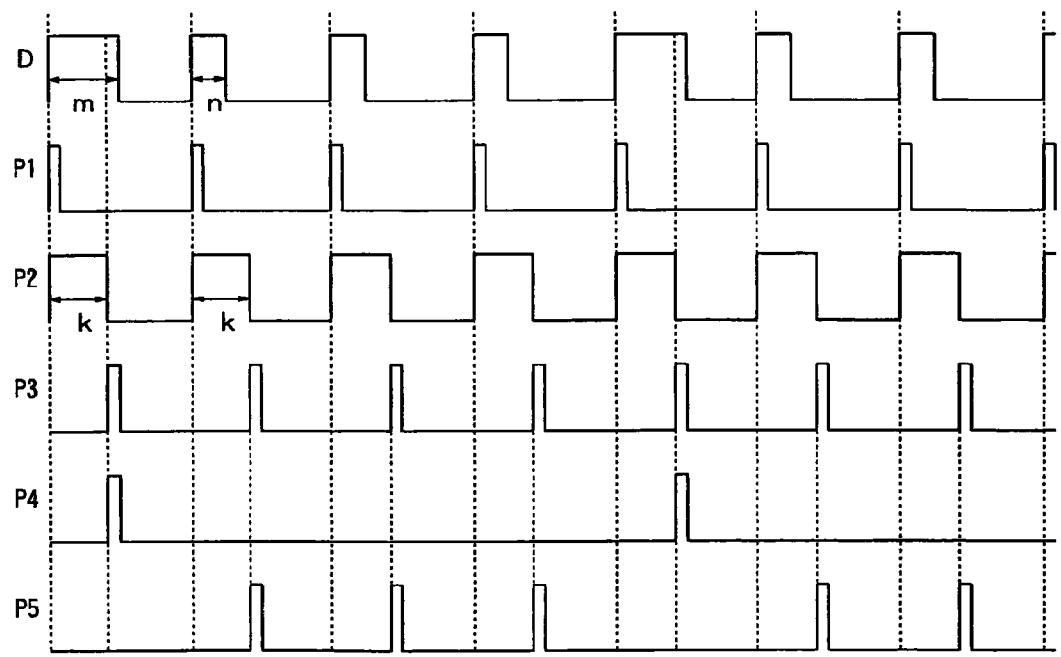
FIG. 15 is a time chart showing an example of the operation of the third embodiment of the signal separating circuit according to the invention.

FIG. 14 shows an example of configuration of a third embodiment of the signal separating circuit according to the invention. FIG. 15 is a time chart showing an example of the operation of the third embodiment of the signal separating circuit according to the invention. The abscissa axis in FIG. 15 expresses time.

This embodiment will be described about the case where the signal separating circuit is made to function as a counter which receives a multiplexed signal D obtained by time-division multiplexing RZ data signals of N channels (N is an integer not smaller than 3) and performs resetting at an RZ data signal D1 of the first channel and counting at RZ data signals D2 to DN of the second to N-th channels. Incidentally, assume that N=4 in FIG. 15. The RZ data signal of the first channel in the multiplexed signal D is always logic "1" and has a pulse period T and a pulse width m. Each of the RZ data signals of the second to N-th channels in the multiplexed signal D is always logic "1" and has a pulse period T and a pulse width n. Incidentally, assume that n<m.

In FIGS. 14 and 15, a first differentiating unit 11 receives the multiplexed signal D and generates a pulse signal P1 with a narrow pulse width in accordance with timing of a leading edge of each pulse of the multiplexed signal D. A first pulse widening unit 12 receives the pulse signal P1 and generates a pulse signal P2 with a pulse width k by widening the pulse width of each pulse of the pulse signal P1. Here, the pulse width k is set in the condition $n<k<m.$ A second differentiating unit 21 receives the pulse signal P2 and generates a pulse signal P3 with a narrow pulse width in accordance with timing of a trailing edge of each pulse of the pulse signal P2. The pulse signal P3 is replicated to form two pulse signals P3, which are input to one input terminal of an AND unit 22-1 and one input terminal of an AND unit 22-2, respectively. The AND unit 22-1 receives the multiplexed signal D at the other input terminal, ANDs the multiplexed signal D and the pulse signal P3 and outputs an ANDed signal P4 corresponding to the first channel. On the other hand, the AND unit 22-2 receiving the pulse signal P3 receives an inverted multiplexed signal D obtained by logically inverting the multiplexed signal D through an inverter unit 24, at the other input terminal, ANDs the inverted multiplexed signal D and the pulse signal P3 and outputs an ANDed signal $\overline{P5}$ corresponding to the second to N-th channels. A counter 71 has a reset terminal to which the ANDed signal P4 synchronized with the first channel is input, and a clock terminal to which the ANDed signal P5 synchronized with the second to N-th channels is input.

Accordingly, the counter 71 is reset at input time of data of the first channel in the multiplexed signal D and outputs a signal counted up or counted down whenever each of data of the second to N-th channels is input. That is, when the multiplexed signal D in which all the first to N-th channels have logic "1" is transmitted periodically or occasionally at regular intervals, sync-timing of each channel can be detected accurately on a reception side.

First Embodiment of Signal Multiplexing Circuit

Figure 16:
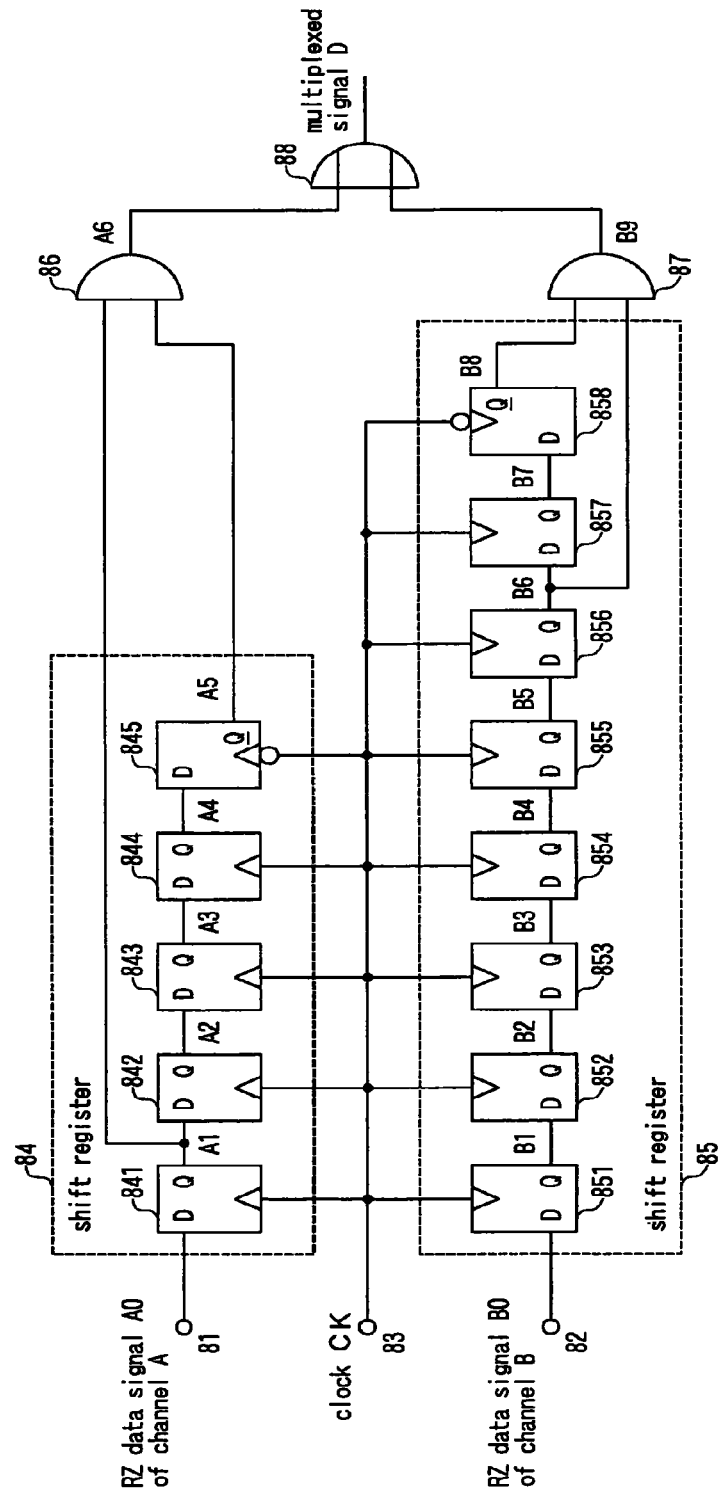
FIG. 16 is a diagram showing an example of configuration of a first embodiment of a signal multiplexing circuit according to the invention.
Figure 17:
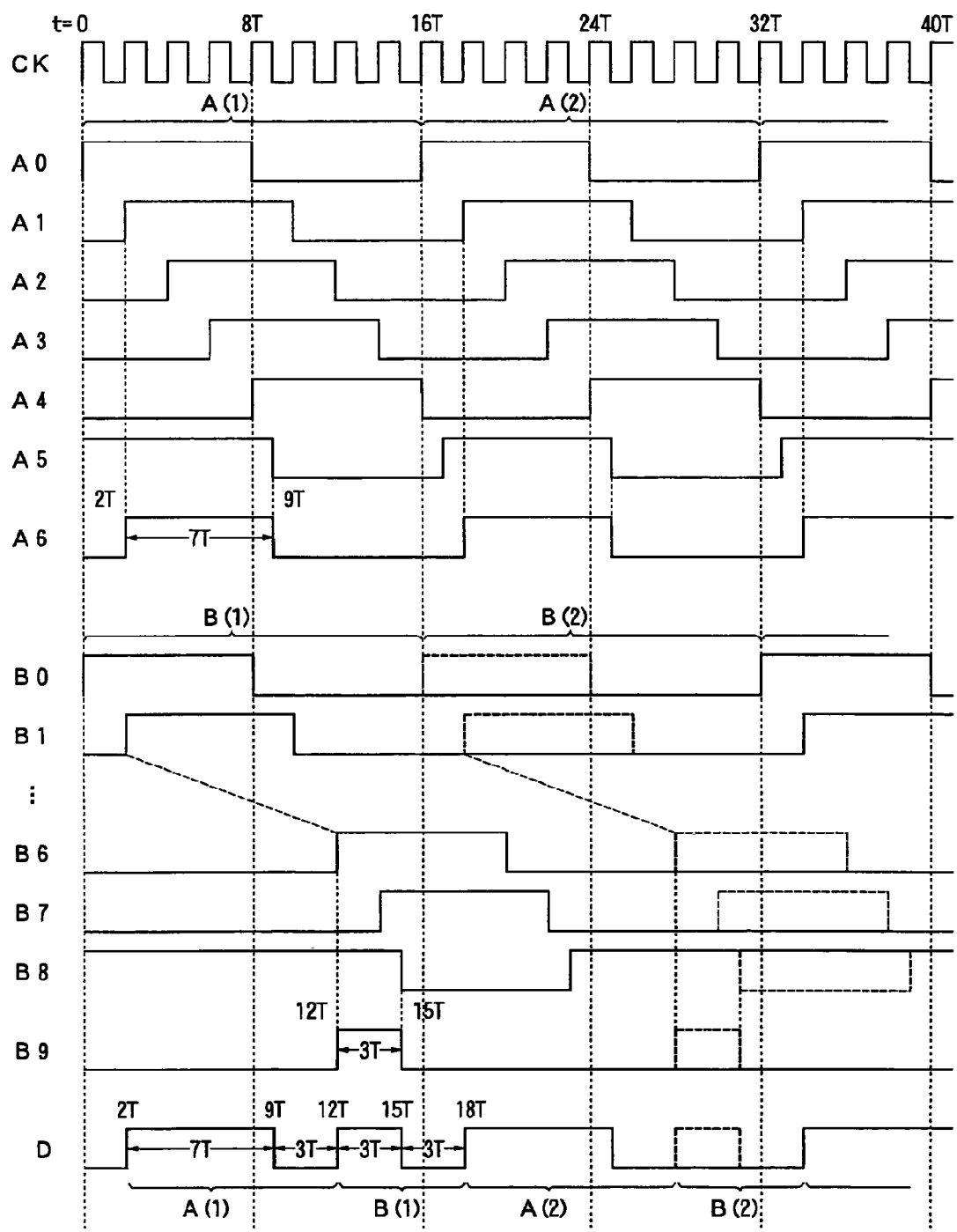
FIG. 17 is a time chart showing an example of the operation of the first embodiment of the signal multiplexing circuit according to the invention.

FIG. 16 shows an example of configuration of a first embodiment of a signal multiplexing circuit according to the invention. FIG. 17 is a time chart showing an example of the operation of the first embodiment of the signal multiplexing circuit according to the invention. The abscissa axis in FIG. 17 expresses time. Here is shown the case where a two-channel multiplexed signal is generated.

In FIGS. 16 and 17, assume that an RZ data signal A0 of channel A input to a signal input terminal 81 and an RZ data signal B0 of channel B input to a signal input terminal 82 have a duty ratio of 50% and are input at the same timing. When a clock CK input to a clock input terminal 83 has a period of 2 T, each of the RZ data signals A0 and B0 has a pulse period of 16 T (a "Hi" level period of 8 T and a "Lo" level period of 8 T).

The RZ data signal A0 is input to a shift register 84 composed of five D flip-flops (DFFs) 841 to 845 cascade-connected. Outputs of the DFFs 841 to 844 transit at a leading edge of the clock CK. Let A1 to A4 be data signals output from output terminals Q of the DFFs 841 to 844. An output of the DFF 845 transits at a trailing edge of the clock CK. Let A5 be a data signal output from an inverted output terminal $\overline{Q}$ of the DFF 845.

The RZ data signal B0 is input to a shift register 85 composed of eight D flip-flops (DFFs) 851 to 858 cascade-connected. Outputs of the DFFs 851 to 857 transit at a leading edge of the clock CK. Let B1 to B7 be data signals output from output terminals Q of the DFFs 851 to 857. An output of the DFF 858 transits at a trailing edge of the clock CK. Let B8 be a data signal output from an inverted output terminal $\overline{Q}$ of the DFF 858.

An AND 86 receives the data signal A1 output from the output terminal Q of the DFF 841 of the shift register 84 and the data signal A5 output from the inverted output terminal $\overline{Q}$ of the DFF 845 of the shift register 84, ANDs the data signals A1 and A5 and outputs a data signal A6. The data signal A6 rises at output timing (t=2 T) of the DFF 841 and falls at output timing (t=9 T) of the DFF 845, so that the "Hi" level period of the data signal A6 is reduced from 8 T to 7 T as against that of the RZ data signal A0 of channel A input to the signal input terminal 81.

On the other hand, an AND 87 receives the data signal B6 output from the output terminal Q of the DFF 856 of the shift register 85 and the data signal B8 output from the inverted output terminal $\overline{Q}$ of the DFF 858 of the shift register 85, ANDs the data signals B6 and B8 and outputs a data signal B9. The data signal B9 rises at output timing (t=12 T) of the DFF 856 and falls at output timing (t=15 T) of the DFF 858, so that the "Hi" level period of the data signal B9 is reduced from 8 T to 3 T as against that of the RZ data signal B0 of channel B input to the signal input terminal 82.

The data signal A6 output from the AND 86 and the data signal B9 output from the AND 87 are supplied to an OR 88, so that a multiplexed signal D obtained by time-division multiplexing data signals of channels A and B is output from the OR 88.

The multiplexed signal D has a feature in that data signals of respective channels are multiplexed so that the pulse periods of the data signals of respective channels differ from each other while the minimum value 3 T of the "Hi" level period and the "Lo" level period is kept in the pulse period 16 T of each of the input RZ data signals A0 and B0, when the minimum value of the "Hi" level period and the "Lo" level period for transmitting the multiplexed signal D as an optical signal is 3 T. That is, with respect to channel A, a "Hi" level period of 7 T and a "Lo" level period of 3 T (a duty ratio of 70%) are set as against a pulse period of 10 T. With respect to channel B, a "Hi" level period of 3 T and a "Lo" level period of 3 T (a duty ratio of 50%) are set as against a pulse period of 6 T. In this manner, multiplexing is performed so that the minimum value of the "Hi" level period and the "Lo" level period of each channel in the multiplexed signal D is not smaller than the minimum allowable value (3 T herein) of the "Hi" level period and the "Lo" level period for transmitting the multiplexed signal D as an optical signal. Incidentally, as long as each of the "Hi" level period and the "Lo" level period of the data signal of at least one channel is the minimum value (3 T), configuration may be made so that each of the "Hi" level period and the "Lo" level period of the data signal of another channel exceeds the minimum value (3 T). Alternatively, configuration may be made so that the "Lo" level period of each of the data signals of all channels is set at the minimum value (3 T) and the "Hi" level period of each of the data signals of all channels is set to exceed the minimum value (3 T).

Such a 2-channel multiplexed signal D can be separated into data signals of respective channels, for example, by the signal separating circuit shown in FIG. 1. In this case, the pulse width k of the pulse signal P2 generated by the first pulse widening unit 12 of the signal separating circuit shown in FIG. 1 can be set in the condition $$3\ T < k < 6\ T$$

because the pulse period of the second channel is 6 T which is narrower than the pulse width 7 T of the first channel.

Modified Examples of First Embodiment of Signal Multiplexing Circuit

Figure 18:
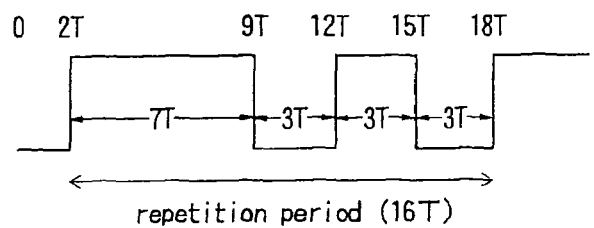
FIG. 18 is a view showing multiplexed signals D based on modified examples of the first embodiment of the signal multiplexing circuit according to the invention.
Figure 18:
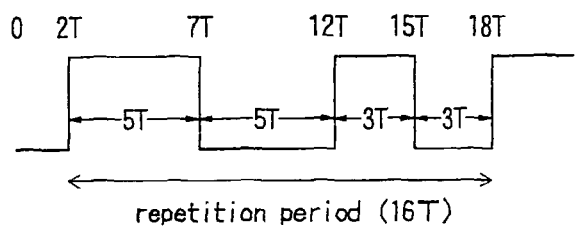
Figure 18:
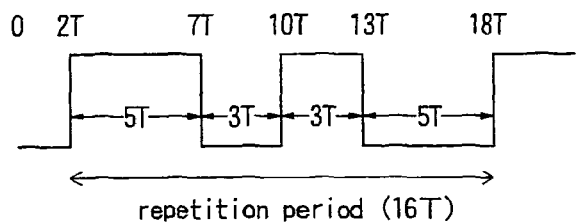
Figure 18:
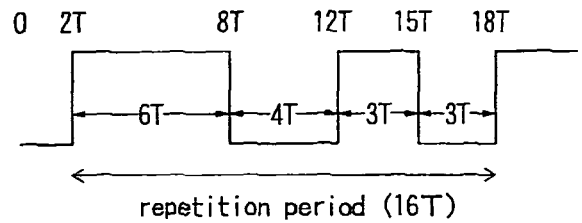

FIG. 18 shows multiplexed signals D based on modified examples of the first embodiment of the signal multiplexing circuit according to the invention. FIG. 18(1) shows a multiplexed signal D generated by the signal multiplexing circuit shown in FIG. 16.

When one of the DFFs 842 to 844 is removed from the shift register 84 in the configuration of the first embodiment shown in FIG. 16, a multiplexed signal D is generated so that a "Hi" level period of 5 T and a "Lo" level period of 5 T (a duty ratio of 50%) are set as against a pulse period of 10 T with respect to channel A as shown in FIG. 18(2). With respect to channel B, a "Hi" level period of 3 T and a "Lo" level period of 3 T (a duty ratio of 50%) are set as against a pulse period of 6 T. To separate such a multiplexed signal D, the pulse width k of the pulse signal P2 generated by the first pulse widening unit 12 of the signal separating circuit shown in FIG. 1 can be set in the following condition.

$$3\ T < k < 5\ T$$

When one of the DFFs 842 to 844 is removed from the shift register 84 in the configuration of the first embodiment shown in FIG. 16 and one of the DFFs 851 to 856 is further removed from the shift register 85, a multiplexed signal D is generated so that a "Hi" level period of 5 T and a "Lo" level period of 3 T (a duty ratio of 62.5%) are set as against a pulse period of 8 T with respect to channel A as shown in FIG. 18(3). With respect to channel B, a "Hi" level period of 3 T and a "Lo" level period of 5 T (a duty ratio of 37.5%) are set as against a pulse period of 8 T. To separate such a multiplexed signal D, the pulse width k of the pulse signal P2 generated by the first pulse widening unit 12 of the signal separating circuit shown in FIG. 1 can be set in the following condition.

$$3\ T < k < 5\ T$$

When configuration is made so that the DFF 845 is removed from the shift register 84 in the configuration of the first embodiment shown in FIG. 16 and the data signal A4 output from the inverted output terminal Q of the DFF 844 is input to the AND 86, a multiplexed signal D is generated so that a "Hi" level period of 6 T and a "Lo" level period of 4 T (a duty ratio of 60%) are set as against a pulse period of 10 T with respect to channel A as shown in FIG. 18(4). With respect to channel B, a "Hi" level period of 3 T and a "Lo" level period of 3 T (a duty ratio of 50%) are set as against a pulse period of 6 T. To separate such a multiplexed signal D, the pulse width k of the pulse signal P2 generated by the first pulse widening unit 12 of the signal separating circuit shown in FIG. 1 can be set in the following condition.

$$3\ T < k < 6\ T$$

In any multiplexed signal D described above, multiplexing is performed in such a manner that the pulse widths of the data signals of respective channels differ from one another so that the channels can be separated by the signal separating circuit shown in FIG. 1 while the minimum allowable value 3 T of the "Hi" level period and the "Lo" level period for transmitting the multiplexed signal D as an optical signal is kept. In the example (2) or (3) of FIG. 18, the pulse width corresponding to channel A is narrowed from 7 T or 6 T to 5 T so that electric power of the transmitted optical signal can be reduced correspondingly but the margin of the pulse width k of the pulse signal P2 in the signal separating circuit is reduced from 3 T to 2 T, compared with the multiplexed signal D in the example (1) or (4) of FIG. 18.

The DFFs 841 and 851 as first stages of the shift registers 84 and 85 in the configuration of the first embodiment shown in FIG. 16 are dispensable when the RZ data signal A0 of channel A input to the signal input terminal 81 and the RZ data signal B0 of channel B input to the signal input terminal 82 are clock-synchronized with each other. Incidentally, even when a delay difference smaller than one clock (2 T) is formed between the data signals A0 and B0, the delay difference can be absorbed by the disposition of the DFFs 841 and 851 as the first stages.

When the RZ data signal B0 of channel B input to the signal input terminal 82 is, for example, 4 T behind the RZ data signal A0 of channel A input to the signal input terminal 81, two DFFs giving a delay of 4 T can be removed from the DFFs 851 to 856 of the shift register 85 in the configuration of FIG. 16. Similarly, when the RZ data signal B0 is input while delayed for a half of the pulse period 16 T, four DFFs giving a delay of 8 T can be removed from the DFFs 851 to 856 of the shift register 85.

Although the aforementioned modified examples have been described on the basis of the configuration of the first embodiment shown in FIG. 16, the configuration of the shift registers 84 and 85 is not limited to the configuration of FIG. 16 as long as multiplexing can be performed so that the pulse widths of the data signals of respective channels differ from one another while the minimum value of the "Hi" level period and the "Lo" level period is kept in the pulse period of each of the RZ data signals A0 and B0 input. For example, the positions and number of DFFs from which outputs transit at an inverted clock can be changed. For example, in the case of the shift register 84 in FIG. 16, the same signal can be generated even when an inverted clock is input to the DFF 844.

Second Embodiment of Signal Multiplexing Circuit

Figure 19:
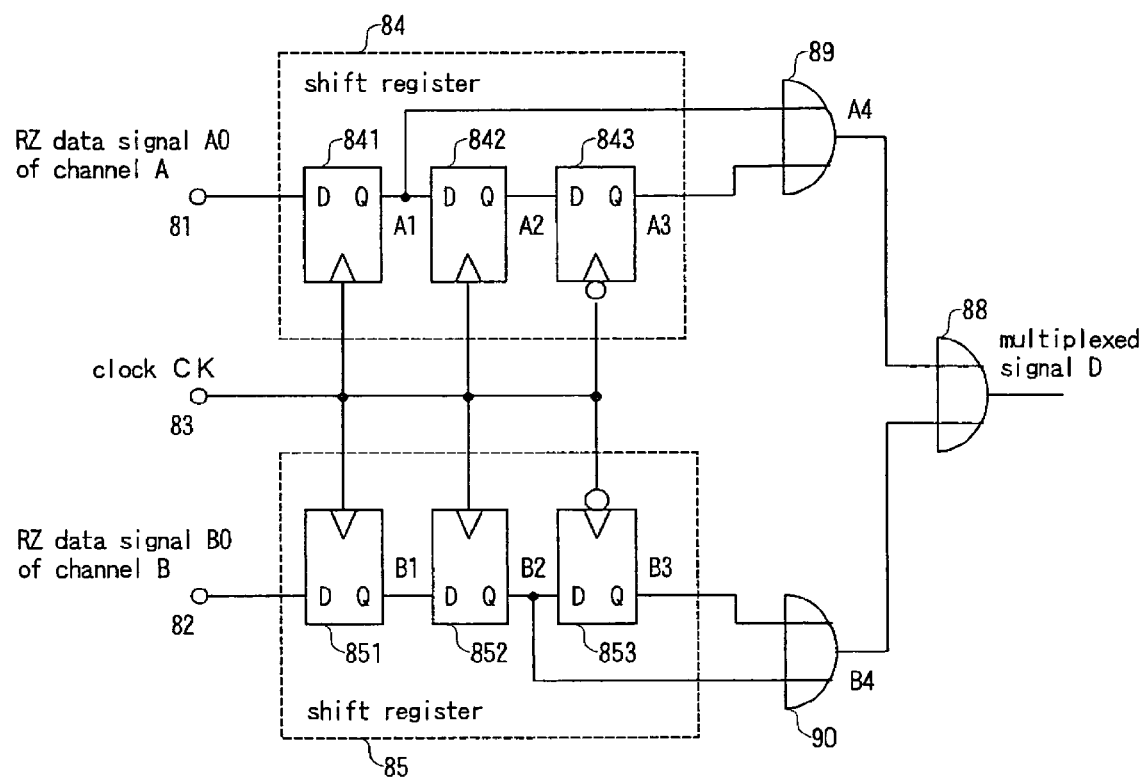
FIG. 19 is a diagram showing an example of configuration of a second embodiment of the signal multiplexing circuit according to the invention.
Figure 20:
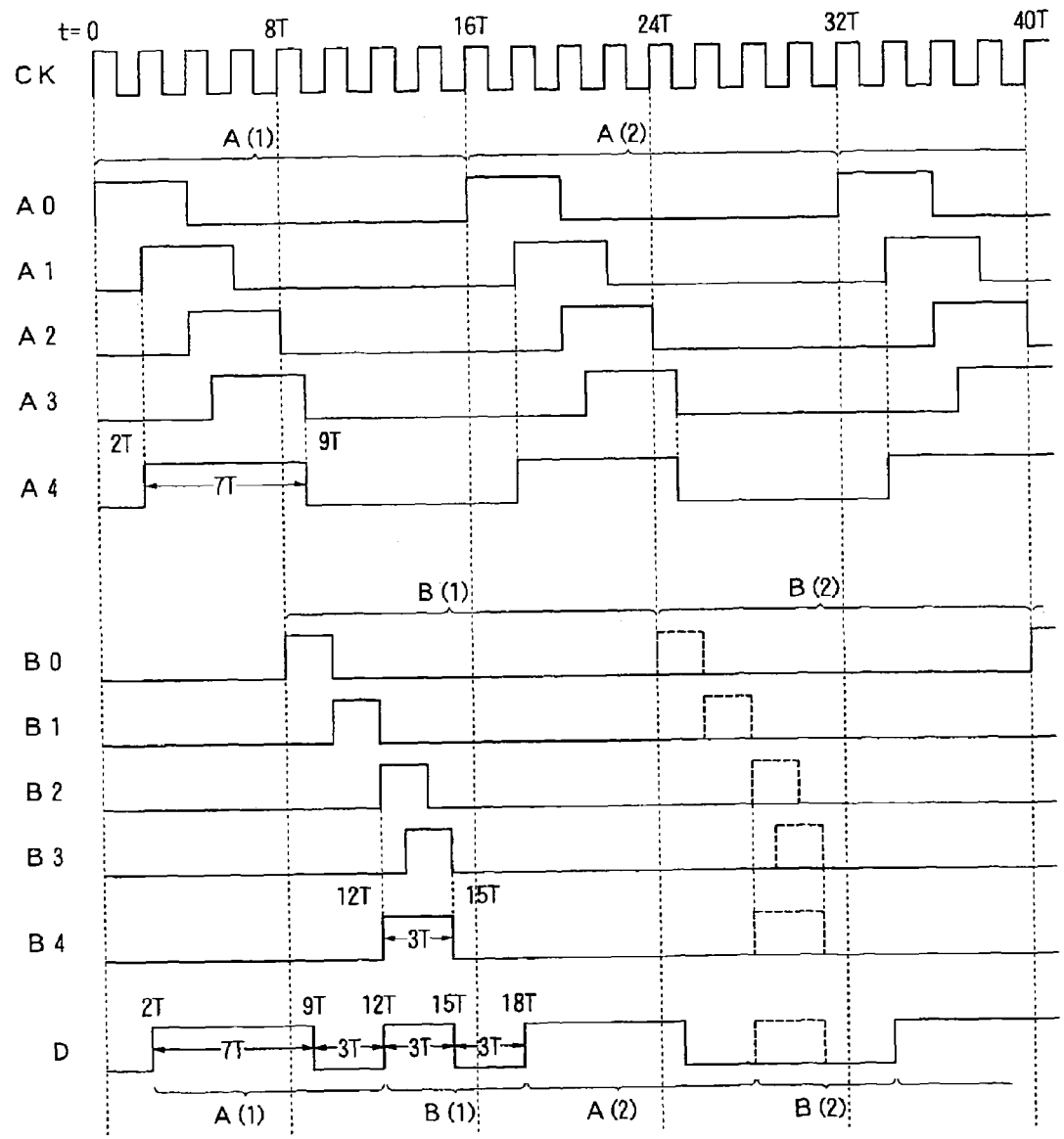
FIG. 20 is a time chart showing an example of the operation of the second embodiment of the signal multiplexing circuit according to the invention.
Figure 21:
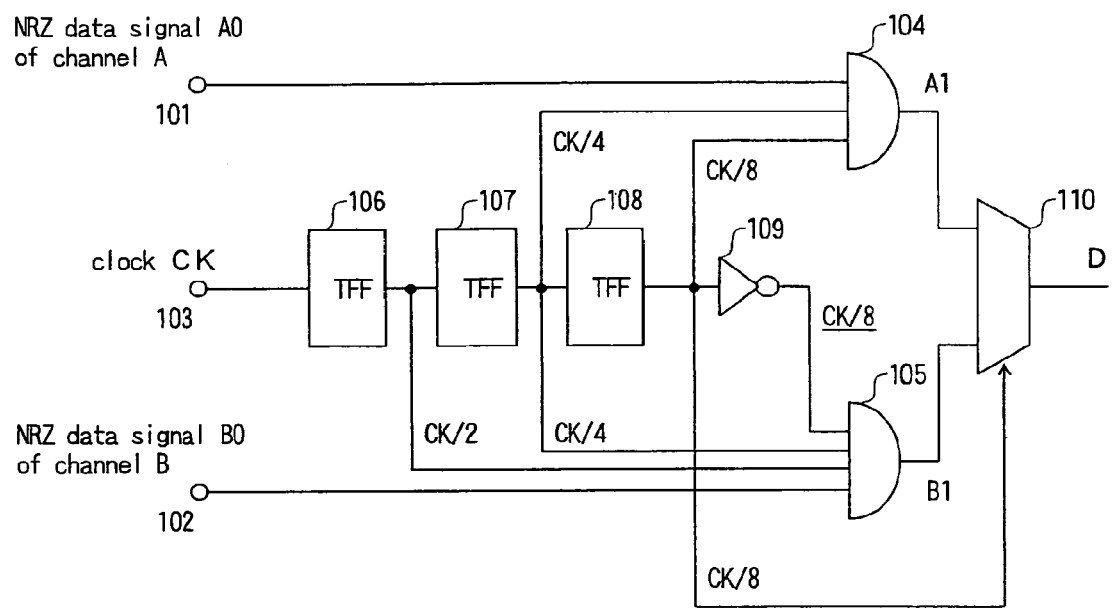
FIG. 21 is a diagram showing an example of configuration of a signal multiplexing circuit according to the background art.

FIG. 19 shows an example of configuration of a second embodiment of the signal multiplexing circuit according to the invention. FIG. 20 is a time chart showing an example of the operation of the second embodiment of the signal multiplexing circuit according to the invention. The abscissa axis in FIG. 20 expresses time. Here is shown the case where a 2-channel multiplexed signal is generated.

In FIGS. 19 and 20, assume that an RZ data signal A0 of channel A input to a signal input terminal 81 has a duty ratio of 25%, an RZ data signal B0 of channel B input to a signal input terminal 82 has a duty ratio of 12.5%, and the RZ data signal B0 is input at timing delayed for a half of the pulse period (16 T) from the RZ data signal A0. When the period of a clock CK input to a clock input terminal 83 is 2 T, the pulse period of each of the RZ data signals A0 and B0 is 16 T.

The RZ data signal A0 is input to a shift register 84 composed of three D flip-flops (DFFs) 841 to 843 cascade-connected. Outputs of the DFFs 841 and 842 transit at a leading edge of the clock CK. Let A1 and A2 be data signals output from output terminals Q of the DFFs 841 and 842 respectively. An output of the DFF 843 transits at a trailing edge of the clock CK. Let A3 be a data signal output from an output terminal Q of the DFF 843.

The RZ data signal B0 is input to a shift register 85 composed of three D flip-flops (DFFs) 851 to 853 cascade-connected. Outputs of the DFFs 851 and 852 transit at a leading edge of the clock CK. Let B1 and B2 be data signals output from output terminals Q of the DFFs 851 and 852 respectively. An output of the DFF 853 transits at a trailing edge of the clock CK. Let B3 be a data signal output from an output terminal Q of the DFF 853.

An OR 89 receives the data signal A1 output from the output terminal Q of the DFF 841 of the shift register 84 and the data signal A3 output from the output terminal Q of the DFF 843 of the shift register 84, and outputs a data signal A4 by ORing the data signals A1 and A3. The data signal A4 rises at output timing (t=2 T) of the DFF 841 and falls at output timing (t=9 T) of the DFF 843, so that the pulse width of the data signal A4 is extended from 2 T to 7 T as against that of the RZ data signal A0 of channel A input to the signal input terminal 81.

On the other hand, an OR 90 receives the data signal B2 output from the output terminal Q of the DFF 852 of the shift register 85 and the data signal B3 output from the output terminal Q of the DFF 853 of the shift register 85, and outputs a data signal B4 by ORing the data signals B2 and B3. The data signal B4 rises at output timing (t=12 T) of the DFF 852 and falls at output timing (t=15 T) of the DFF 853, so that the pulse width of the data signal B4 is extended from 2 T to 3 T as against that of the RZ data signal B0 of channel B input to the signal input terminal 82.

The data signal A4 output from the OR 89 and the data signal B4 output from the OR 90 are supplied to an OR 88, so that a multiplexed signal D obtained by time-division multiplexing data signals of channels A and B is output from the OR 88.

The multiplexed signal D has a feature in that data signals of respective channels are multiplexed so that the pulse periods of the data signals of respective channels differ from each other while the minimum value 3 T of the "Hi" level period and the "Lo" level period is kept in the pulse period 16 T of each of the input RZ data signals A0 and B0, when the minimum allowable value of the "Hi" level period and the "Lo" level period for transmitting the multiplexed signal D as an optical signal is 3 T. That is, although a multiplexed signal shown in the background art is obtained when data signals of respective channels are synthesized simply, a data signal of channel A with a pulse period of 10 T and a data signal of channel B with a pulse period of 6 T are multiplexed in this embodiment. That is, the data signal of channel A has a "Hi" level period of 7 T and a "Lo" level period of 3 T (a duty ratio of 70%) whereas the data signal of channel B has a "Hi" level period of 3 T and a "Lo" level period of 3 T (a duty ratio of 50%).

Modified Examples of Second Embodiment of Signal Multiplexing Circuit

When the DFF 842 is removed from the shift register 84 in the configuration of the second embodiment shown in FIG. 19, a multiplexed signal D is generated so that a "Hi" level period of 5 T and a "Lo" level period of 5 T (a duty ratio of 50%) are set as against a pulse period of 10 T with respect to channel A as shown in FIG. 18(2). With respect to channel B, a "Hi" level period of 3 T and a "Lo" level period of 3 T (a duty ratio of 50%) are set as against a pulse period of 6 T. To separate such a multiplexed signal D, the pulse width k of the pulse signal P2 generated by the first pulse widening unit 12 of the signal separating circuit shown in FIG. 1 can be set in the following condition.

$$3\,T < k < 5\,T$$

When the DFF 842 is removed from the shift register 84 in the configuration of the second embodiment shown in FIG. 19 and one of the DFFs 851 and 852 is further removed from the shift register 85, a multiplexed signal D is generated so that a "Hi" level period of 5 T and a "Lo" level period of 3 T (a duty ratio of 62.5%) are set as against a pulse period of 8 T with respect to channel A as shown in FIG. 18(3). With respect to channel B, a "Hi" level period of 3 T and a "Lo" level period of 5 T (a duty ratio of 37.5%) are set as against a pulse period of 8 T. To separate such a multiplexed signal D, the pulse width k of the pulse signal P2 generated by the first pulse widening unit 12 of the signal separating circuit shown in FIG. 1 can be set in the following condition.

$$3\,T < k < 5\,T$$

The DFFs 841 and 851 as first stages of the shift registers 84 and 85 in the configuration of the second embodiment shown in FIG. 19 are dispensable when the RZ data signal A0 of channel A input to the signal input terminal 81 and the RZ data signal B0 of channel B input to the signal input terminal 82 are clock-synchronized with each other. Incidentally, even when a delay difference smaller than one clock (2 T) is formed between the RZ data signals A0 and B0, the delay difference can be absorbed by the disposition of the DFFs 841 and 851 as the first stages.

When a delay difference of 8 T is not present between the RZ data signal A0 of channel A input to the signal input terminal 81 and the RZ data signal B0 of channel B input to the signal input terminal 82, four DFFs giving a delay of 8 T can be added as stages prior to the DFFs 851 and 852 of the shift register 85 in the configuration of FIG. 19.

Although the aforementioned modified examples have been described on the basis of the configuration of the second embodiment shown in FIG. 19, the configuration of the shift registers 84 and 85 is not limited to the configuration of FIG. 19 as long as multiplexing can be performed so that the pulse widths of the data signals of respective channels differ from one another while the minimum value of the "Hi" level period and the "Lo" level period is kept in the repetition period of each of the RZ data signals A0 and B0 input.

Other Embodiments of Signal Multiplexing Circuit

When, for example, the RZ data signal A0 of channel A is an RZ signal shown in FIG. 17 and the RZ data signal B0 of channel B is an RZ signal shown in FIG. 20 in the two embodiments described above, the shift register 84 and the AND 86 shown in FIG. 16 may be used so that the pulse width can be reduced from 8 T to 7 T, and the shift register 85 and the OR 90 shown in FIG. 19 may be used so that the pulse width can be extended from 2 T to 3 T. In this manner, the configuration of the shift register, etc. can be adjusted appropriately in accordance with the pulse width and timing of the input data signal of each channel to thereby generate a multiplexed signal in the same form.

The two embodiments have been described about the case where a 2-channel multiplexed signal is generated. To apply the signal multiplexing circuit to multiplexing of 3 channels or more, shift registers and ANDs or ORs as shown in FIGS. 16 and 19 may be provided in accordance with the number of channels to be multiplexed so that the pulse period of each channel can be set in accordance with the minimum value of the time slot ("Hi" level period and "Lo" level period) of each of channels in the multiplexed signal. For example, to multiplex data signals of 3 channels so that the "Hi" level periods of the data signals differ from one another while the minimum value 3 T of the "Hi" level period and the "Lo" level period is kept, configuration can be made so that the repetition period of 3 channels is set at 24 T, a "Hi" level period of 7 T and a "Lo" level period of 3 T (a duty ratio of 70%) are set as against a pulse period of 10 T with respect to the first channel, a "Hi" level period of 5 T and a "Lo" level period of 3 T (a duty ratio of 62.5%) are set as against a pulse period of 8 T with respect to the second channel, and a "Hi" level period of 3 T and a "Lo" level period of 3 T (a duty ratio of 50%) are set as against a pulse period of 6 T with respect to the third channel.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A signal multiplexing circuit for receiving data signals of first and second channels which are RZ (Return to Zero) signals, and for generating a multiplexed signal obtained by time-division multiplexing the data signals of the first and second channels at a repetition period T of the first and second channels, comprising:
defining $T_1$ as the pulse period of the data signal of the first channel, defining $T_2$ as the pulse period of the data signal of the second channel, further defining $T_1$ and $T_2$ such that $T=T_1+T_2$;
a first pulse generating circuit converting the data signal of the first channel to a signal which has a period of m as the pulse width of the "Hi" level and a period of $T_1-m$ as the pulse width of the "Lo" level of a logic "1" data signal of the first channel based on a clock signal;
a second pulse generating circuit converting the data signal of the second channel to a signal which has a period of n as the pulse width of the "Hi" level and a period of $T_2-n$ as the pulse width of the "Lo" level of a logic "1" data signal of the second channel based on the clock signal;
a time-division multiplexing circuit time-division multiplexing and outputting the data signals of the first and second channels as a multiplexed signal having "Hi" level period m, "Lo" level period $T_1-m$, "Hi" level period n, and "Lo" level period $T_2-n$, wherein
the minimum value of the "Hi" level period n and the "Lo" level periods $(T_1-m)$ and $(T_2-n)$ is not smaller than a predetermined value while n<m is satisfied.

2. A signal multiplexing circuit for receiving data signals of first to N-th channels (N is an integer not smaller than 3) which are RZ (Return to Zero) signals, and for generating a multiplexed signal obtained by time-division multiplexing the data signals of the N channels at a repetition period T of the N channels, comprising:
defining $T_1$ as the pulse period of the data signal of a first channel of said N channels, defining $T_2$ to $T_N$ as the respective pulse periods of the data signals of a second channel and remaining channels of said N channels, further defining $T_1$ and $T_2$ to $T_N$ such that $T=T_1+T_2+\ldots+T_N$;
a first pulse generating circuit converting the data signal of the first channel to a signal which has a period of m as the pulse width of the "Hi" level and period of $T_1-m$ as the pulse width of the "Lo" level of a logic "1" data signal of the first channel of said N channels based on a clock signal;
second to Nth pulse generating circuits converting the data signals of the second channel and remaining channels of said N channels to signals which have periods of $n_2$ to $n_N$ respectively as the pulse widths of the "Hi" level and periods of $(T_2-n_2)$ to $(T_N-n_N)$ respectively as the pulse widths of the "Lo" level of logic "1" data signals of the second channel and remaining channels of said N channels based on the clock signal;
a time-division multiplexing circuit time-division multiplexing and outputting the data signals of the N channels as a multiplexed signal having "Hi" level period m, "Lo" level period $T_1-m$, "Hi" level period $n_2$, "Lo" level period $(T_2-n_2)$, to "Hi" level period $n_N$, "Lo" level period $(T_N-n_N)$, wherein
the minimum value of the "Hi" level periods $n_2$ to $n_N$ and the "Lo" level periods $(T_1-m)$ and $(T_2-n_2)$ to $(T_N-n_N)$ is not smaller than a predetermined value while a maximum value of $n_2$ to $n_N$ is smaller than m.

3. The signal multiplexing circuit according to claim 1 or 2, wherein each of the "Hi" level period and the "Lo" level period of the data signal of one channel is set at said predetermined value.

4. The signal multiplexing circuit according to claim 1 or 2, wherein each of the "Lo" level periods of the data signals of all channels is set at said predetermined value.

5. The signal multiplexing circuit according to claim 1 or 2, wherein said predetermined value is a value decided by characteristic of an optical signal transmitter-receiver which transmits and receives said data signal of each channel, which is a 1-bit quantized signal, as an optical signal.

6. A signal multiplexing method for receiving data signals of first and second channels which are RZ (Return to Zero) signals, and for generating a multiplexed signal obtained by time-division multiplexing the data signals of the first and second channels at a repetition period T of the first and second channels, comprising:
- defining $T_1$ as the pulse period of the data signal of the first channel, defining $T_2$ as the pulse period of the data signal of the second channel, further defining $T_1$ and $T_2$ such that $T=T_1+T_2$;
- defining m as the pulse width of the "Hi" level of a logic "1" data signal of the first channel and such that the "Lo" level of said logic "1" data signal of the first channel has a period of $T_1-m$;
- defining n as the pulse width of the "Hi" level of a logic "1" data signal of the second channel and such that the "Lo" level of said logic "1" data signal of the second channel has a period of $T_2-n$;
- generating and time-division multiplexing the data signals of the first and second channels to meet the constraint that the minimum value of "Hi" level period n and "Lo" level periods $(T_1-m)$ and $(T_2-n)$ is not smaller than a predetermined value while n<m is satisfied.

7. A signal multiplexing method for receiving data signals of first to N-th channels (N is an integer not smaller than 3) which are RZ (Return to Zero) signals, and for generating a multiplexed signal obtained by time-division multiplexing the data signals of the N channels at a repetition period T of the N channels, comprising:
- defining $T_1$ as the pulse period of the data signal of a first channel of said N channels, defining $T_2$ to $T_N$ as the respective pulse periods of the data signals of a second channel and remaining channels of said N channels, further defining $T_1$ and $T_2$ to $T_N$ such that $T=T_1+T_2+\ldots+T_N$;
- defining m as the pulse width of the "Hi" level of a logic "1" data signal of a first channel of said N channels and such that the "Lo" level of said logic "1" data signal of the first channel has a period of $T_1-m$;
- defining $n_2$ to $n_N$ respectively as the pulse widths of the "Hi" level of logic "1" data signals of the second channel and remaining channels of said N channels and such that the "Lo" level of said logic "1" data signals of the second channel and remaining channels of said N channels have periods of $T_2-n_2$ to $T_N-n_N$, respectively;
- generating and time-division multiplexing the data signals of the N channels to meeting the constraint that the minimum value of "Hi" level periods $n_2$ to $n_N$ and "Lo" level periods $(T_1-m)$ and $(T_2-n_2)$ to $(T_N-n_N)$ is not smaller than a predetermined value while a maximum value of $n_2$ to $n_N$ is smaller than m.

* * * * *